(12) United States Patent
Sekiguchi et al.

(10) Patent No.: US 10,178,327 B2
(45) Date of Patent: Jan. 8, 2019

(54) IMAGING DEVICE, METHOD FOR CONTROLLING IMAGING DEVICE, AND CONTROL PROGRAM

(71) Applicant: JVC KENWOOD Corporation, Yokohama-shi, Kanagawa (JP)

(72) Inventors: Satoru Sekiguchi, Yokohama (JP); Takayoshi Sasao, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 204 days.

(21) Appl. No.: 15/187,054

(22) Filed: Jun. 20, 2016

(65) Prior Publication Data

US 2016/0295135 A1    Oct. 6, 2016

Related U.S. Application Data

(63) Continuation of application No. PCT/JP2014/066841, filed on Jun. 25, 2014.

(30) Foreign Application Priority Data

Dec. 26, 2013    (JP) ................................ 2013-269096

(51) Int. Cl.
*H04N 5/33*        (2006.01)
*H04N 5/353*      (2011.01)
(Continued)

(52) U.S. Cl.
CPC .......... *H04N 5/332* (2013.01); *H04N 5/2256* (2013.01); *H04N 5/238* (2013.01); *H04N 5/2354* (2013.01);
(Continued)

(58) Field of Classification Search
CPC .. H04N 5/23245; H04N 5/332; H04N 5/3537; H04N 9/04; H04N 5/2256; H04N 5/2354; H04N 5/238; H04N 9/045
See application file for complete search history.

(56) References Cited

U.S. PATENT DOCUMENTS

2008/0231728 A1*    9/2008   Asoma .................. G03B 7/093
                                                                   348/229.1

FOREIGN PATENT DOCUMENTS

CN        101272458 A       9/2008
JP        2008-236142 A    10/2008
(Continued)

OTHER PUBLICATIONS

CN office action dated Mar. 1, 2017 for counterpart CN application 201480071124.7.
(Continued)

*Primary Examiner* — Anand S Rao
*Assistant Examiner* — Tyler B Edwards
(74) *Attorney, Agent, or Firm* — Nath, Goldberg & Meyer; Jerald L. Meyer

(57) ABSTRACT

An imaging unit causes each exposure corresponding to one frame period of respective second image signals in a first mode, and causes each exposure in divided sections of one frame period of the respective second image signals under different imaging conditions in a second mode. An image processing unit generates frames of respective first image signals based on each imaging signal read out in such a manner as to correspond to each exposure corresponding to one frame period in the first mode, and generates frames of the respective first image signals based on each imaging signal read out in such a manner as to correspond to each exposure of the divided sections in the second mode. An image output unit sequentially outputs frames of the second
(Continued)

image signals set to a signal format common to the first mode and the second mode.

8 Claims, 31 Drawing Sheets

(51) Int. Cl.
- *H04N 9/04* (2006.01)
- *H04N 5/232* (2006.01)
- *H04N 5/238* (2006.01)
- *H04N 5/225* (2006.01)
- *H04N 5/235* (2006.01)

(52) U.S. Cl.
CPC ....... *H04N 5/23245* (2013.01); *H04N 5/3537* (2013.01); *H04N 9/04* (2013.01); *H04N 9/045* (2013.01)

(56) References Cited

FOREIGN PATENT DOCUMENTS

| | | |
|---|---|---|
| JP | 2008236142 A | 10/2008 |
| JP | 2011050049 A | 3/2011 |

OTHER PUBLICATIONS

Office Action dated May 26, 2017 issued in corresponding Japanese Application No. 2013-269096.
International Search Report dated Sep. 22, 2014, corresponding to International application No. PCT/JP2014/066841.

* cited by examiner

FIG. 14
(a)
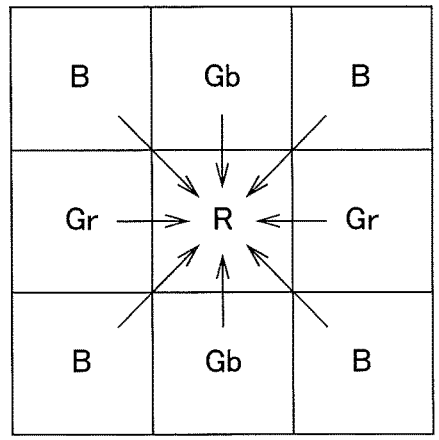
(b)
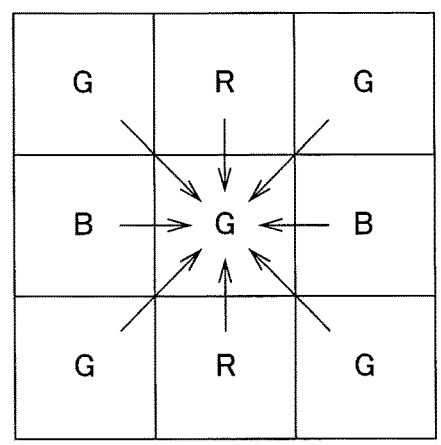
(c)
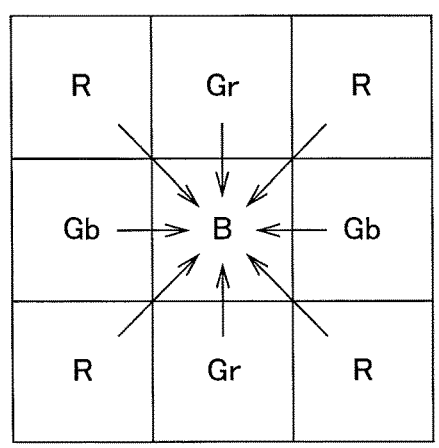

FIG. 19

(a) FmIR123' ad

| R1ad | Gr2ad | R1ad | Gr2ad | R1ad | Gr2ad |
|---|---|---|---|---|---|
| Gb2ad | B3ad | Gb2ad | B3ad | Gb2ad | B3ad |
| R1ad | Gr2ad | R1ad | Gr2ad | R1ad | Gr2ad |
| Gb2ad | B3ad | Gb2ad | B3ad | Gb2ad | B3ad |
| R1ad | Gr2ad | R1ad | Gr2ad | R1ad | Gr2ad |
| Gb2ad | B3ad | Gb2ad | B3ad | Gb2ad | B3ad |

(b) FmIR123' adR

| R1ad | R1adi | R1ad | R1adi | R1ad | R1adi |
|---|---|---|---|---|---|
| R1adi | R1ad | R1adi | R1ad | R1adi | R1ad |
| R1ad | R1adi | R1ad | R1adi | R1ad | R1adi |
| R1adi | R1ad | R1adi | R1ad | R1adi | R1ad |
| R1ad | R1adi | R1ad | R1adi | R1ad | R1adi |
| R1adi | R1ad | R1adi | R1ad | R1adi | R1ad |

(c) FmIR123' adG

| G2adi | G2ad | G2adi | G2ad | G2adi | G2ad |
|---|---|---|---|---|---|
| G2ad | G2adi | G2ad | G2adi | G2ad | G2adi |
| G2adi | G2ad | G2adi | G2ad | G2adi | G2ad |
| G2ad | G2adi | G2ad | G2adi | G2ad | G2adi |
| G2adi | G2ad | G2adi | G2ad | G2adi | G2ad |
| G2ad | G2adi | G2ad | G2adi | G2ad | G2adi |

(d) FmIR123' adB

| B3adi | B3ad | B3adi | B3ad | B3adi | B3ad |
|---|---|---|---|---|---|
| B3ad | B3adi | B3ad | B3adi | B3ad | B3adi |
| B3adi | B3ad | B3adi | B3ad | B3adi | B3ad |
| B3ad | B3adi | B3ad | B3adi | B3ad | B3adi |
| B3adi | B3ad | B3adi | B3ad | B3adi | B3ad |
| B3ad | B3adi | B3ad | B3adi | B3ad | B3adi |

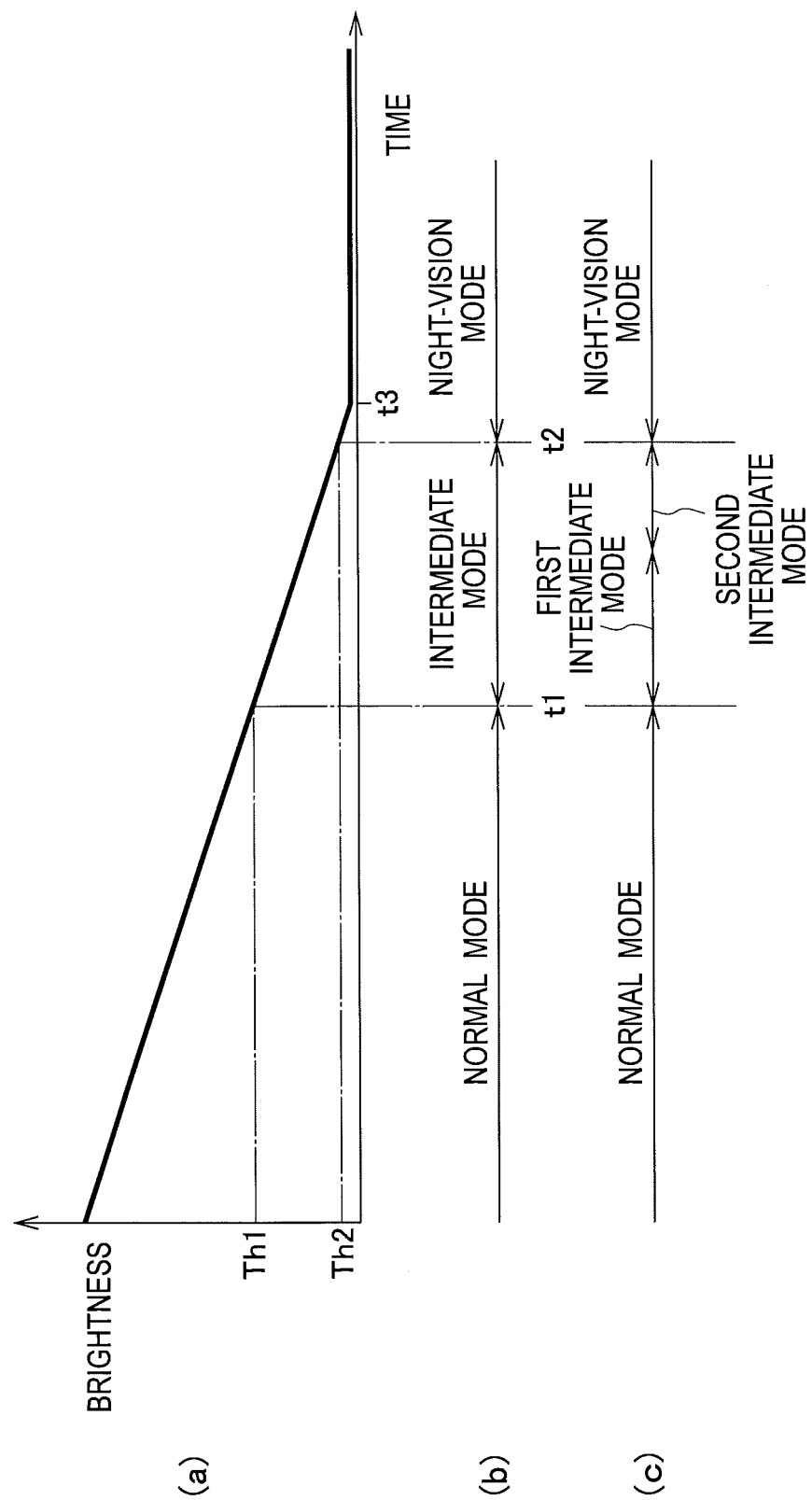

FIG. 21

| | INFRARED PROJECTOR 9 | PRE-SIGNAL PROCESSING UNIT 52 | | | DEMOSAICING UNIT 54 |
| --- | --- | --- | --- | --- | --- |
| | | SURROUNDING PIXEL ADDING UNIT 521 | SAME-POSITION PIXEL ADDING UNIT 522 | SYNTHESIZING UNIT 523 | |
| NORMAL MODE | OFF | INACTIVATED | INACTIVATED | INACTIVATED | ACTIVATED |
| FIRST INTERMEDIATE MODE | ON | INACTIVATED | ACTIVATED | ACTIVATED | |
| SECOND INTERMEDIATE MODE | ON | INACTIVATED | INACTIVATED | ACTIVATED | |
| FIRST NIGHT-VISION MODE | ON | ACTIVATED | ACTIVATED | ACTIVATED | |
| SECOND NIGHT-VISION MODE | ON | ACTIVATED | INACTIVATED | ACTIVATED | |

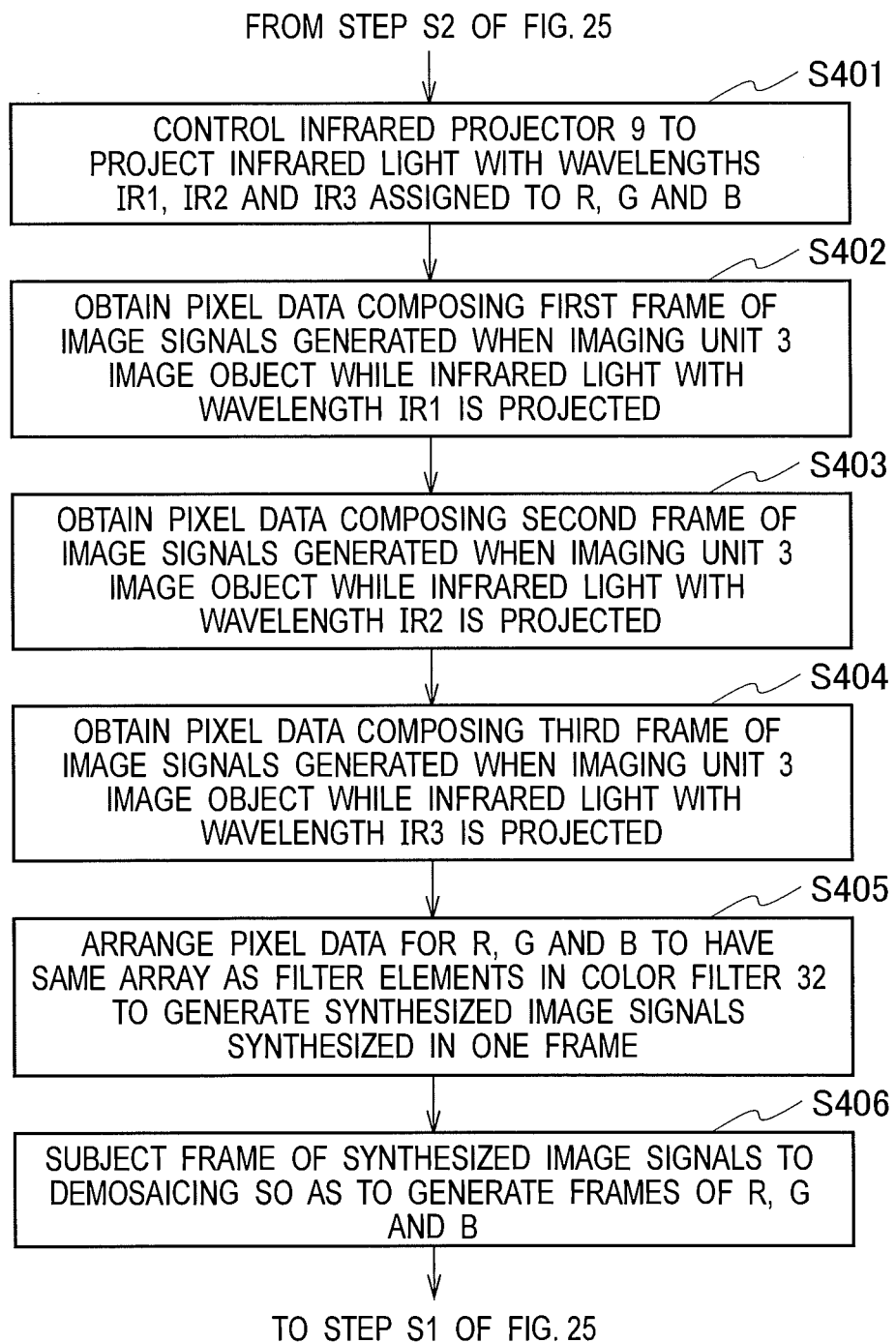

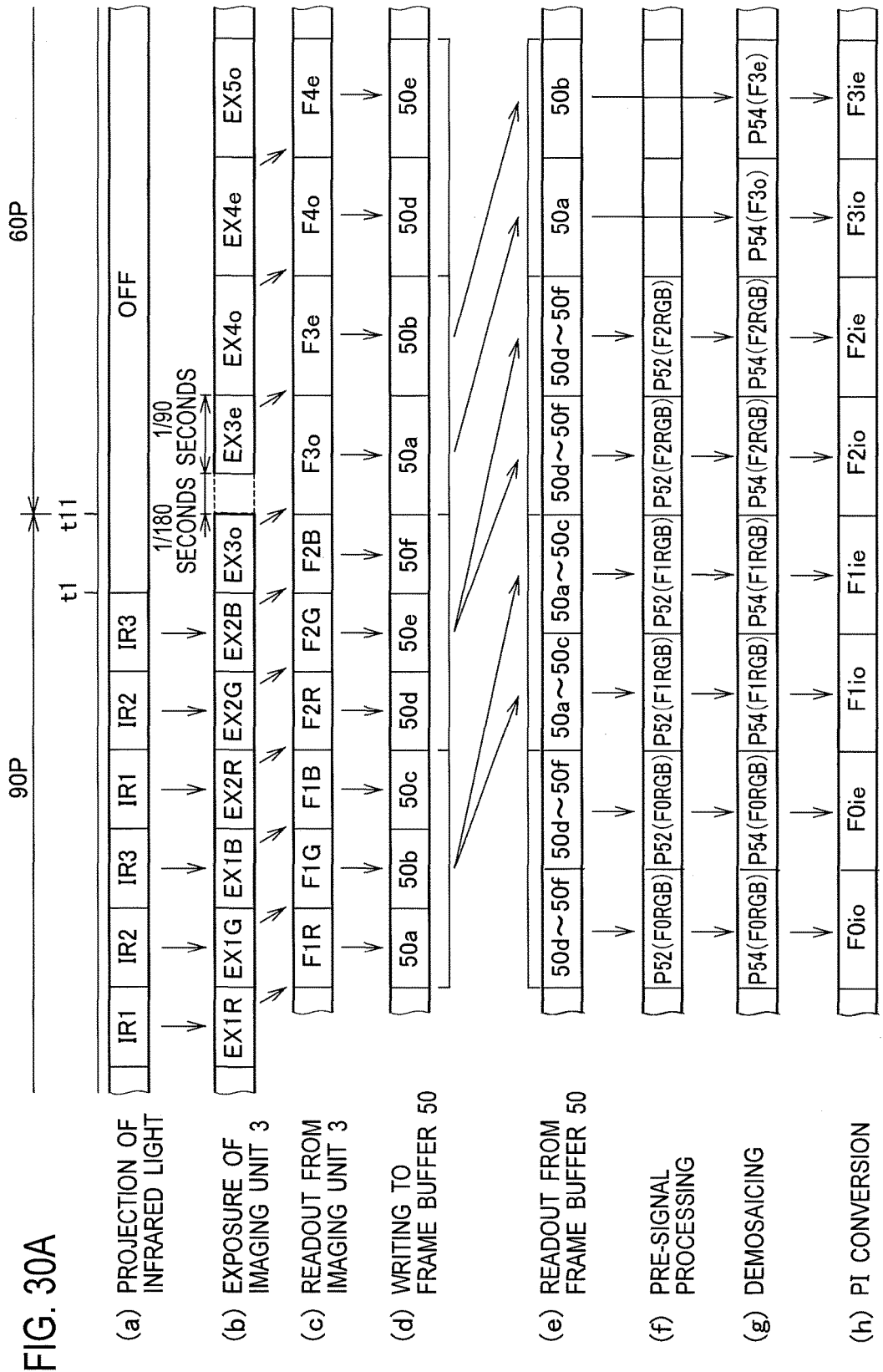

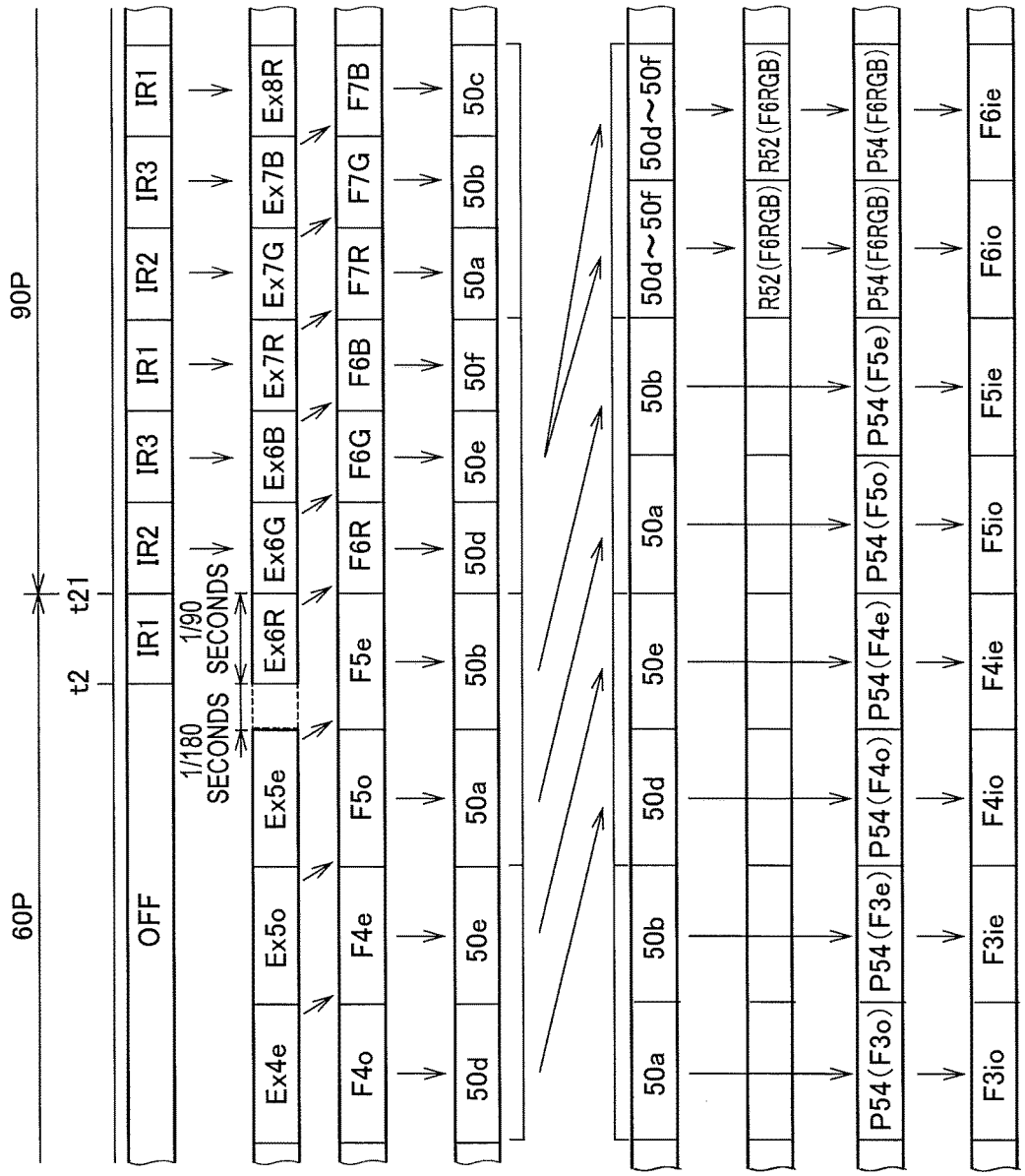

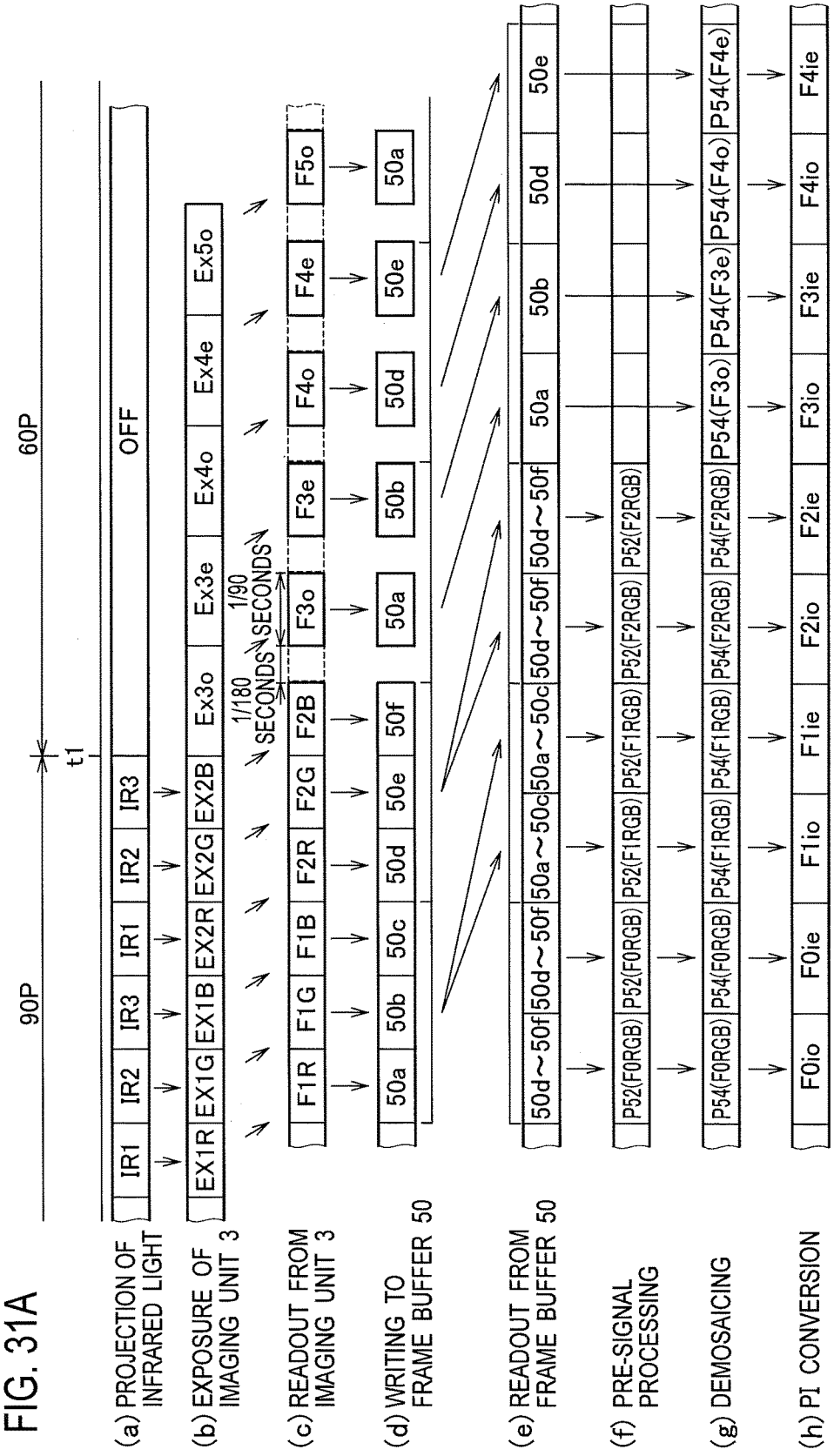

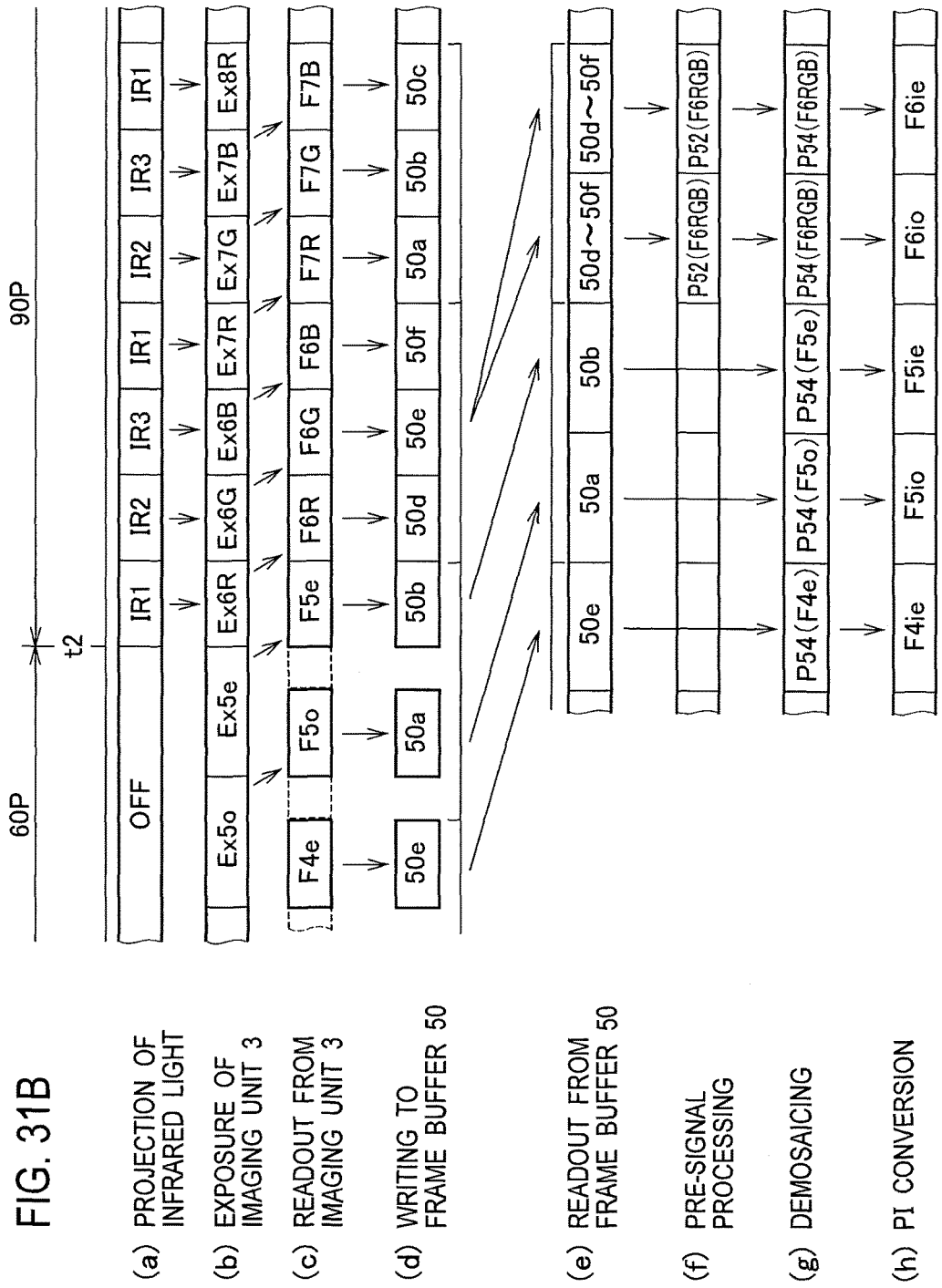

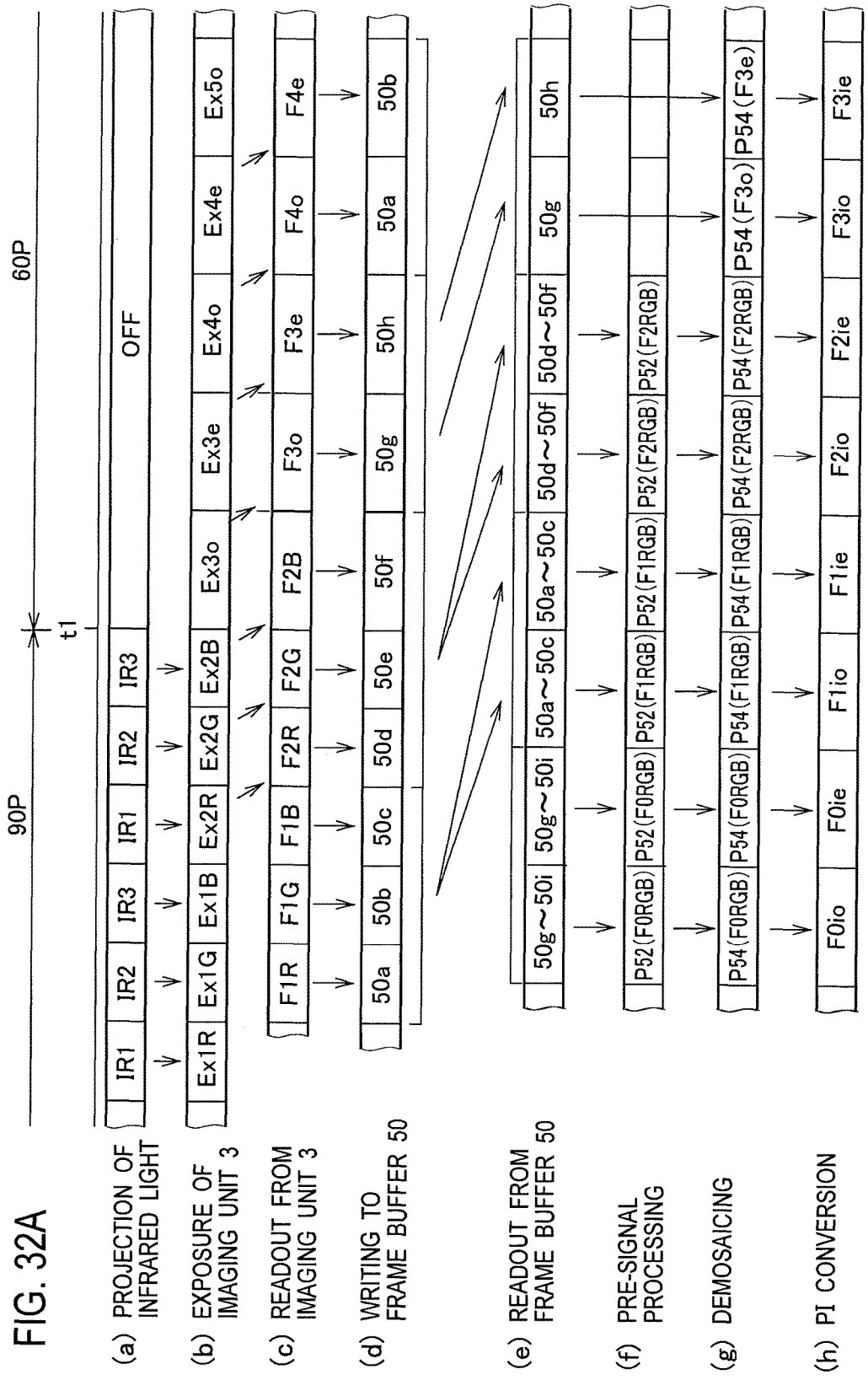

IMAGING DEVICE, METHOD FOR CONTROLLING IMAGING DEVICE, AND CONTROL PROGRAM

CROSS REFERENCE TO RELATED APPLICATION

This application is a Continuation of PCT Application No. PCT/JP2014/066841, filed on Jun. 25, 2014, and claims the priority of Japanese Patent Application No. 2013-269096, filed on Dec. 26, 2013, the entire contents of both of which are incorporated herein by reference.

BACKGROUND

The present disclosure relates to an imaging device, a method for controlling an imaging device, and a control program.

There is known a method for imaging an object under the condition that almost no visible light is available, such as during nighttime, by radiating infrared light onto the object from an infrared projector and imaging infrared light reflected by the object. This imaging method is effective in a case where lighting fixtures for radiating visible light cannot be used.

However, since an image obtained by imaging the object by this method is a monochromatic image, it is difficult to identify the object from the monochromatic image depending on circumstances. If a color image can be captured even under the condition that no visible light is available, the performance of identifying the object can be improved. For example, it is expected that surveillance cameras can capture color images under the condition that no visible light is available in order to improve performance for identifying objects.

Japanese Unexamined Patent Application Publication No. 2011-050049 (Patent Document 1) describes an imaging device capable of capturing color images under the condition that no visible light is available. The imaging device described in Patent Document 1 uses an infrared projector. Incorporating the technique described in Patent Document 1 into a surveillance camera can capture a color image of an object so as to improve the identification of the object.

SUMMARY

It is desirable to implement both normal imaging under the condition that visible light is present and night-vision imaging by use of an infrared projector under the condition that the amount of visible light is small, with a single imaging device. As used herein, the term "normal mode" refers to the state when the imaging device implements normal imaging without using an infrared projector, and the term "infrared projecting mode" refers to the state when the imaging device implements imaging while projecting infrared light with an infrared projector.

The imaging device equipped with two imaging modes, the normal mode and the infrared projecting mode, preferably switches from the normal mode (first mode) to the infrared projecting mode (second mode), or from the infrared projecting mode (second mode) to the normal mode (first mode) without image distortion.

A first aspect of the embodiments provides an imaging device including: an imaging unit configured to image an object; an image processing unit configured to generate first image signals based on imaging signals output from the imaging unit; and an image output unit configured to generate and output second image signals in a predetermined signal format based on the first image signals, wherein the imaging unit causes each exposure corresponding to one frame period of the respective second image signals so as to image the object in a first mode, and causes each exposure in divided sections of one frame period of the respective second image signals under different imaging conditions so as to image the object in a second mode, the image processing unit generates frames of the respective first image signals based on each imaging signal read out in such a manner as to correspond to each exposure corresponding to one frame period in the first mode, and generates frames of the respective first image signals based on each imaging signal read out in such a manner as to correspond to each exposure of the divided sections in the second mode, the image output unit sequentially outputs frames of the second image signals set to a signal format common to the first mode and the second mode.

A second aspect of the embodiments provides a method for controlling an imaging device, including: directing an imaging unit of the imaging device to image an object; generating first image signals based on each imaging signal of the object imaged by the imaging unit; generating second image signals in a predetermined signal format based on the first imaging signal; when setting the imaging device to a first mode, directing the imaging unit to cause each exposure corresponding to one frame period of the respective second image signals so as to image the object, and generating frames of the respective first image signals based on each imaging signal read out in such a manner as to correspond to each exposure corresponding to one frame period; when setting the imaging device to a second mode, directing the imaging unit to cause each exposure in divided sections of one frame period of the respective second image signals under different imaging conditions so as to image the object, and generating frames of the respective first image signals based on each imaging signal read out in such a manner as to correspond to each exposure of the divided sections; and sequentially outputting frames of the second image signals which are set to a signal format and horizontal and vertical frequencies common to the first mode and the second mode.

A third aspect of the embodiments provides a control program for an imaging device stored in a non-transitory storage medium and executable by a computer installed in the imaging device to implement steps of the control program, the steps comprising: a first step of directing an imaging unit of the imaging device to image an object; a second step of generating first image signals based on each imaging signal of the object imaged by the imaging unit; and a third step of generating second image signals in a predetermined signal format based on the first imaging signal, when setting the imaging device to a first mode, the first step including a step of directing the imaging unit to cause each exposure corresponding to one frame period of the respective second image signals so as to image the object, the second step including a step of generating frames of the respective first image signals based on each imaging signal read out in such a manner as to correspond to each exposure corresponding to one frame period, when setting the imaging device to a second mode, the first step including a step of directing the imaging unit to cause each exposure in divided sections of one frame period of the respective second image signals under different imaging conditions so as to image the object, the second step including a step of generating frames of the respective first image signals based on each imaging signal read out in such a manner as to correspond to each exposure of the divided sections, when switching the imaging device from the first mode to the second mode and from the second mode to the first mode, the third step including a step of sequentially outputting frames of the second image signals which are set to a signal format, and horizontal and vertical frequencies common to the first mode and the second mode.

BRIEF DESCRIPTION OF THE DRAWINGS

FIG. 14 is a view for describing processing of adding surrounding pixels when the imaging device according to the embodiment is operating in the night-vision mode.

FIG. 19 is a view for describing demosaicing when the imaging device according to the embodiment is operating in the second night-vision mode.

FIG. 20 is a view for describing an example of a mode switch in the imaging device according to the embodiment.

FIG. 21 is a view showing conditions of the respective members when the imaging device according to the embodiment is set to the respective modes.

FIG. 29 is a flowchart showing a processing step in which an image signal processing program stored in the imaging device according to the embodiment instructs a computer to implement.

FIG. 30A is a view showing a sequence of a first example of a mode switching method of switching between the normal mode and the infrared projecting mode.

FIG. 30B is a view showing a sequence of a first example of a mode switching method of switching between the normal mode and the infrared projecting mode.

FIG. 31A is a view showing a sequence of a second example of a mode switching method of switching between the normal mode and the infrared projecting mode.

FIG. 31B is a view showing a sequence of a second example of a mode switching method of switching between the normal mode and the infrared projecting mode.

FIG. 32A is a view showing a sequence of a third example of a mode switching method of switching between the normal mode and the infrared projecting mode.

DETAILED DESCRIPTION

Hereinafter, an imaging device, a method for controlling an imaging device, and a control program according to an embodiment will be described with reference to appended drawings.

Configuration of Imaging Device

First, the entire configuration of the imaging device according to the embodiment is described below with reference to FIG. 1. The imaging device according to the embodiment shown in FIG. 1 is capable of capturing images in three modes including a normal mode suitable for imaging in a state where sufficient visible light is present such as during the day, a night-vision mode suitable for imaging in a state where almost no visible light is present such as at night, and an intermediate mode suitable for imaging in a state where visible light is slightly present.

The night-vision mode and the intermediate mode are both infrared projecting modes for capturing images while projecting infrared light, under the condition that the amount of visible light is small. The infrared projecting mode may only include the night-vision mode. The embodiment will be exemplified by an imaging device as a preferable example, capable of imaging in three modes, including the intermediate mode.

Figure 1:
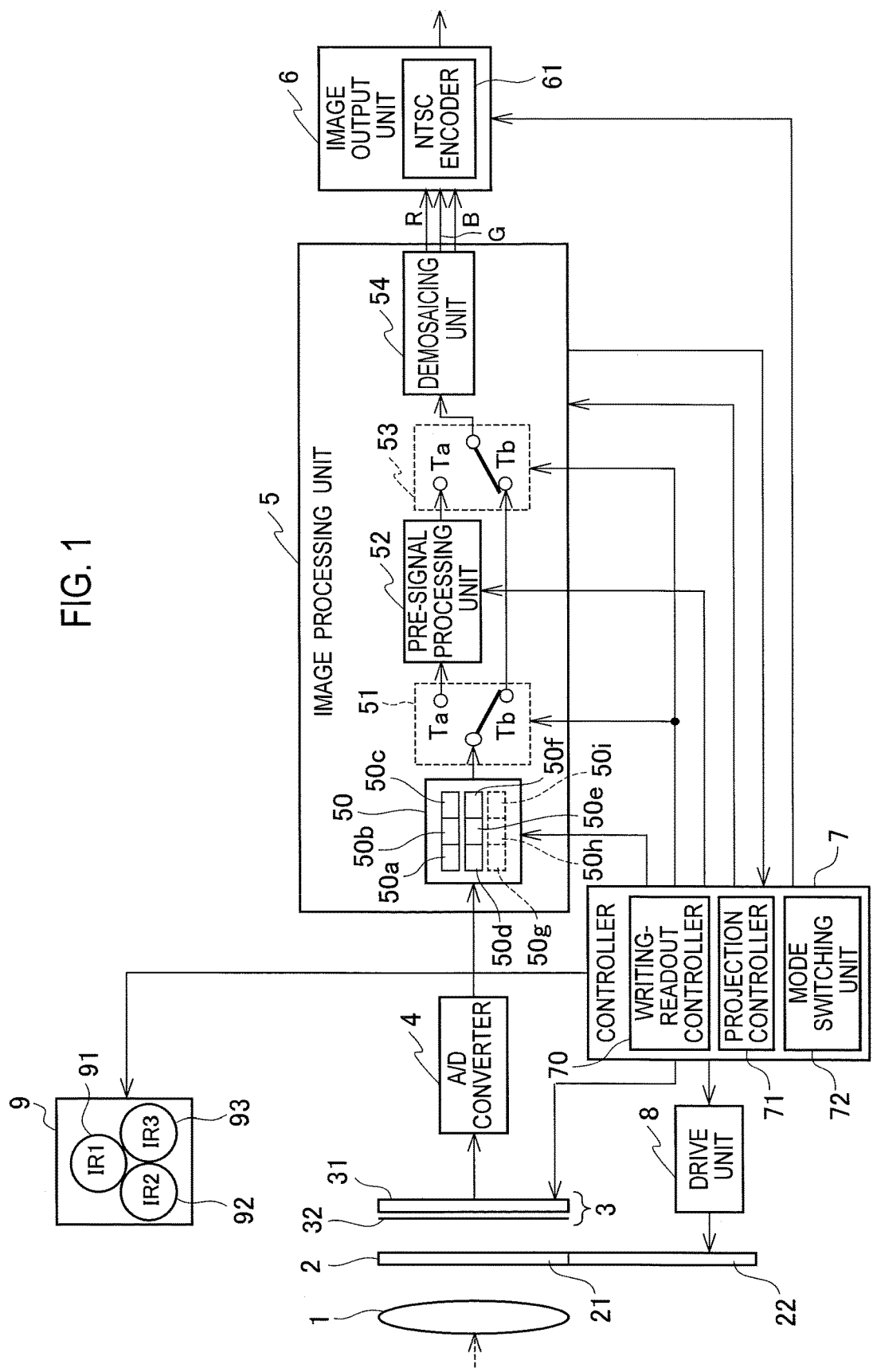
FIG. 1 is a block diagram showing an overall configuration of an imaging device of according to at least one embodiment.

As shown in FIG. 1, a light indicated by the dashed-dotted line reflected by an object is collected by an optical lens 1. Here, visible light enters the optical lens 1 under the condition that visible light is present sufficiently, and infrared light emitted from an infrared projector 9 described below and reflected by the object enters the optical lens 1 under the condition that almost no visible light is present.

In the state where visible light is slightly present, mixed light including both the visible light and the infrared light emitted from the infrared projector 9 and reflected by the object, enters the optical lens 1.

Although FIG. 1 shows only one optical lens 1 for reasons of simplification, the imaging device actually includes a plurality of optical lenses.

An optical filter 2 is interposed between the optical lens 1 and an imaging unit 3. The optical filter 2 includes two members; an infrared cut filter 21 and a dummy glass 22. The optical filter 2 is driven by a drive unit 8 in a manner such that the infrared cut filter 21 is inserted between the optical lens 1 and the imaging unit 3 or such that the dummy glass 22 is inserted between the optical lens 1 and the imaging unit 3.

The imaging unit 3 includes an imaging element 31 in which a plurality of light receiving elements (pixels) are arranged in both the horizontal direction and the vertical direction, and a color filter 32 in which filter elements of red (R), green (G) or blue (B) corresponding to the respective light receiving elements are arranged. The imaging element 31 may be either a charge coupled device (CCD) or a complementary metal oxide semiconductor (CMOS).

Figure 2:
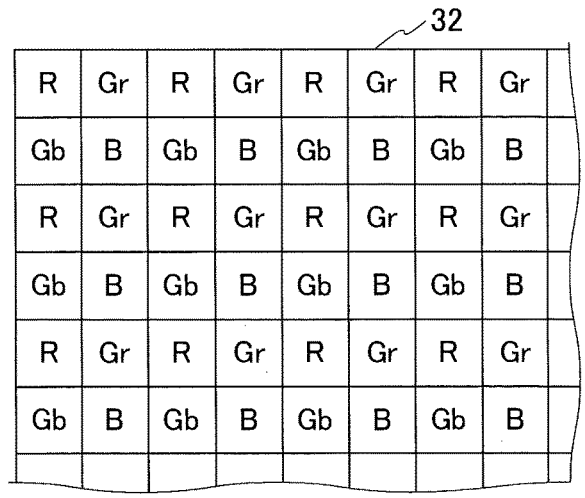
FIG. 2 is a view showing an example of an array of filter elements in a color filter used in the imaging device according to the embodiment.

In the color filter 32, for example, the filter elements of each of R, G and B are arranged in a pattern called a Bayer array, as shown in FIG. 2. The Bayer array is an example of predetermined arrays of the filter elements of R, G and B. In FIG. 2, each of the filter elements of G in each line held between the filter elements of R is indicated by Gr, and each of the filter elements of G held between the filter elements of B is indicated by Gb.

The Bayer array has a configuration in which the horizontal lines alternating the filter elements of R with the filter elements of Gr and the horizontal lines alternating the filter elements of B with the filter elements of Gb are aligned alternately with each other in the vertical direction.

Figure 3:
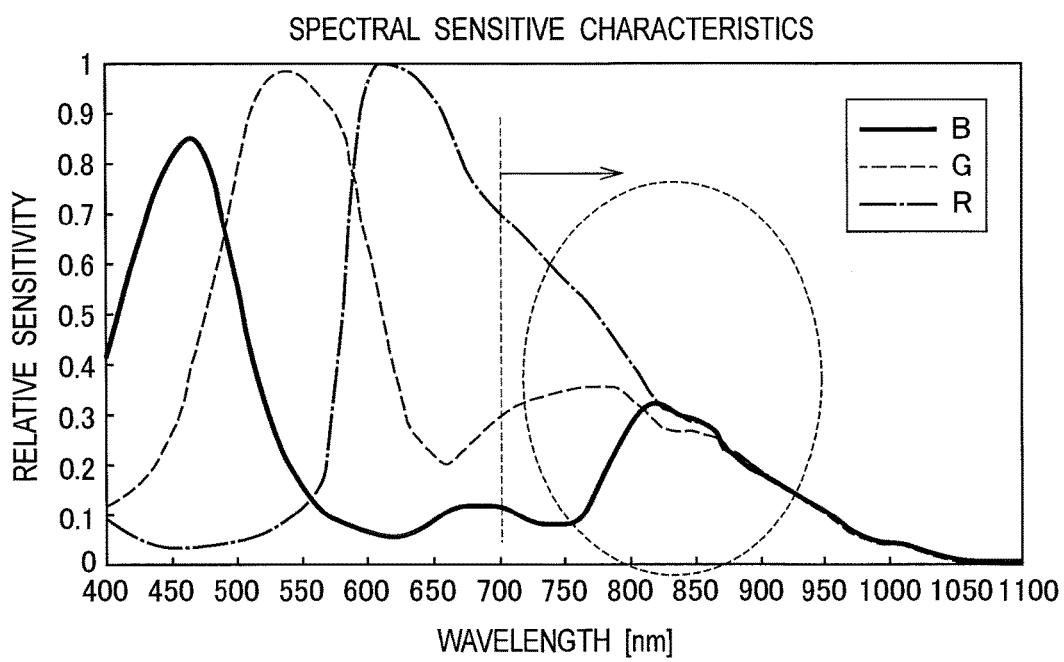
FIG. 3 is a characteristic diagram showing spectral sensitive characteristics of wavelengths and relative sensitivities of light of three primary colors in an imaging unit included in the imaging device according to the embodiment.

FIG. 3 shows spectral sensitive characteristics of wavelengths and relative sensitivities of R light, G light and B light in the imaging unit 3. The maximum value of the relative sensitivities is normalized to 1. When the imaging device is operated in the normal mode, infrared light having a wavelength of 700 nm or greater is required to be blocked in order to capture fine color images with visible light.

The drive unit 8 is thus controlled by a controller 7 to drive the optical filter 2 in such a manner as to insert the infrared cut filter 21 between the optical lens 1 and the imaging unit 3.

As is apparent from FIG. 3, the imaging unit 3 shows the sensitivities in the area where the infrared light having the wavelength of 700 nm or greater is present. Therefore, when the imaging device is operated in the intermediate mode or in the night-vision mode, the drive unit 8 is controlled by the controller 7 to drive the optical filter 2 in such a manner as to remove the infrared cut filter 21 from between the optical lens 1 and the imaging unit 3 and insert the dummy glass 22 therebetween.

When the dummy glass 22 is inserted between the optical lens 1 and the imaging unit 3, the infrared light having the wavelength of 700 nm or greater is not blocked. Thus, the imaging device can obtain information of each of R, G and B by using the sensitivities in the oval region surrounded by the broken line in FIG. 3. The reason the dummy glass 22 is inserted is to conform the optical path length obtained when the dummy glass 22 is used to the optical path length obtained when the infrared cut filter 21 is used.

The infrared projector 9 includes projecting portions 91, 92 and 93 for projecting infrared light with wavelengths IR1, IR2 and IR3, respectively. In the case of the intermediate mode or the night-vision mode, a projection controller 71 in the controller 7 controls the projecting portions 91, 92 and 93 so as to selectively project the infrared light with the respective wavelengths IR1, IR2 and IR3 in a time division manner.

Figure 4:
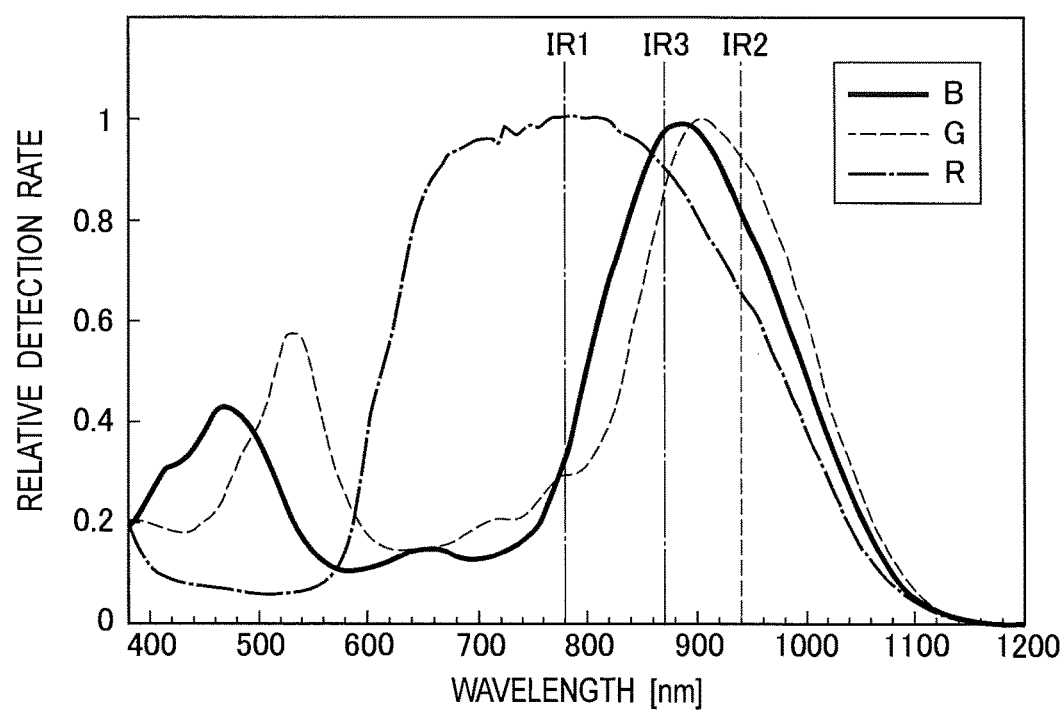
FIG. 4 is a characteristic diagram showing a relationship between wavelengths and relative detection rates when multiplying, by a light receiving sensitivity of silicon, a reflectance of light of each primary color obtained from a particular substance.

Here, a silicon wafer is used in the imaging element 31. FIG. 4 shows a relationship between wavelengths and relative detection rates when a reflectance at each wavelength is multiplied by a light receiving sensitivity of silicon in a case where a material consisting of each of the colors R, G and B is irradiated with white light. The maximum value of the relative detection rates in FIG. 4 is also normalized to 1.

For example, as shown in FIG. 4, in the infrared light area, the reflected light with the wavelength of 780 nm has a strong correlation with the reflected light of the material with color R, the reflected light with the wavelength of 870 nm has a strong correlation with the reflected light of the material with color B, and the reflected light with the wavelength of 940 nm has a strong correlation with the reflected light of the material with color G.

Thus, according to the present embodiment, the wavelengths IR1, IR2 and IR3 of infrared light projected from the projecting portions 91, 92 and 93 are set to 780 nm, 940 nm and 870 nm, respectively. These values are examples for the wavelengths IR1, IR2 and IR3, and other wavelengths other than 780 nm, 940 nm and 870 nm may also be employed.

The projecting portion 91 radiates the infrared light with the wavelength IR1 on an object, and an image signal obtained, in a manner such that light reflected by the object is captured, is assigned to an R signal. The projecting portion 93 radiates the infrared light with the wavelength IR2 on the object, and an image signal obtained, in a manner such that light reflected by the object is captured, is assigned to a G signal. The projecting portion 92 radiates the infrared light with the wavelength IR3 on the object, and an image signal obtained, in a manner such that light reflected by the object is captured, is assigned to a B signal.

Accordingly, even in the intermediate mode or in the night-vision mode, a color similar to that obtained when the object is imaged in the normal mode in the state where visible light is present, can be reproduced theoretically.

Alternatively, the wavelength IR1 of 780 nm may be assigned to the R light, the wavelength IR3 of 870 nm may be assigned to the G light, and the wavelength IR2 of 940 nm may be assigned to the B light, although in this case the color image would possess a color tone different from the actual color tone of the object. The wavelengths IR1, IR2 and IR3 may be assigned optionally to the R light, the G light and the B light.

According to the present embodiment, the wavelengths IR1, IR2 and IR3 are assigned to the R light, the G light and the B light, respectively, by which the color tone of the object can be reproduced most finely.

The controller 7 controls the imaging unit 3, the respective components in an image processing unit 5, and an image output unit 6.

A schematic configuration of the imaging element 31 and the way of controlling the imaging device 3 by the controller 7 are described below, in the case where the imaging element 31 is a CCD.

Figure 5:
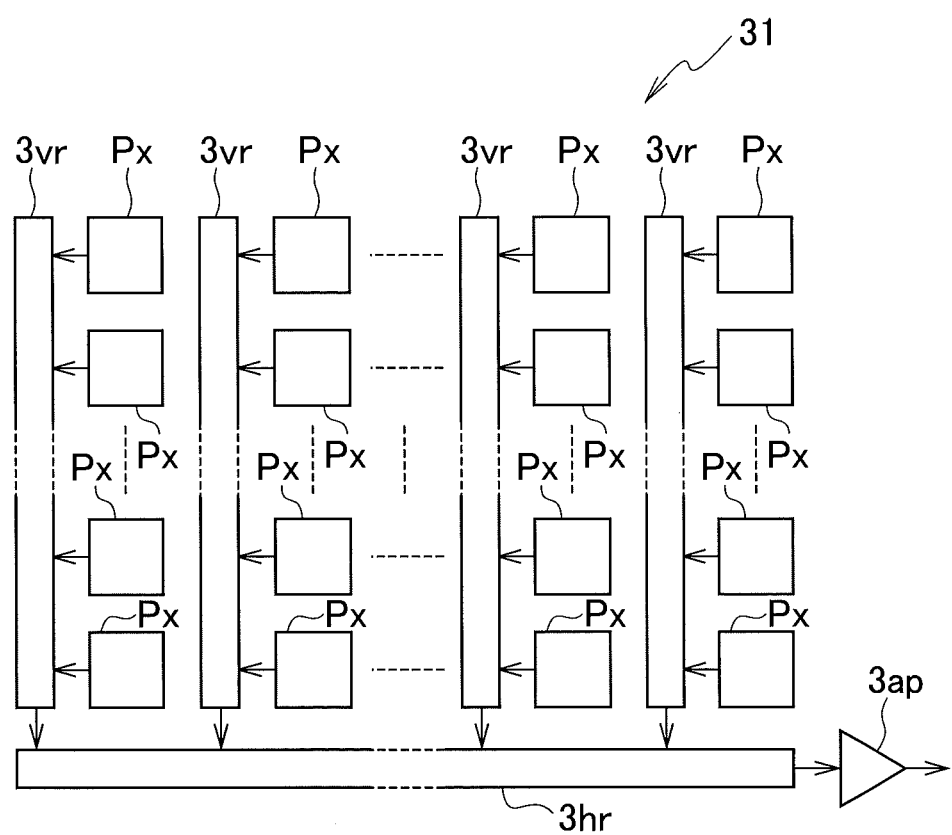
FIG. 5 is a block diagram showing an example of a specific configuration of an imaging element 31 shown in FIG. 1.

As shown in FIG. 5, the imaging element 31 includes a plurality of light-receiving elements Px arranged in both the horizontal and vertical directions. The imaging element 31 includes vertical transfer registers 3vr parallel to the respective lines of the light-receiving elements Px, aligned in the vertical direction, and a horizontal transfer register 3hr connected to the respective vertical transfer registers 3vr.

The respective filter elements of R, G, and B in the color filter 32 shown in FIG. 2 are assigned to the respective light-receiving elements Px arranged in the horizontal and vertical directions. Although the light-receiving elements Px are actually separated from each other in the horizontal and vertical directions as shown in FIG. 5, the respective filter elements in the color filter 32 shown in FIG. 2 are arranged with no gap interposed therebetween for reasons of expediency.

Figure 6:
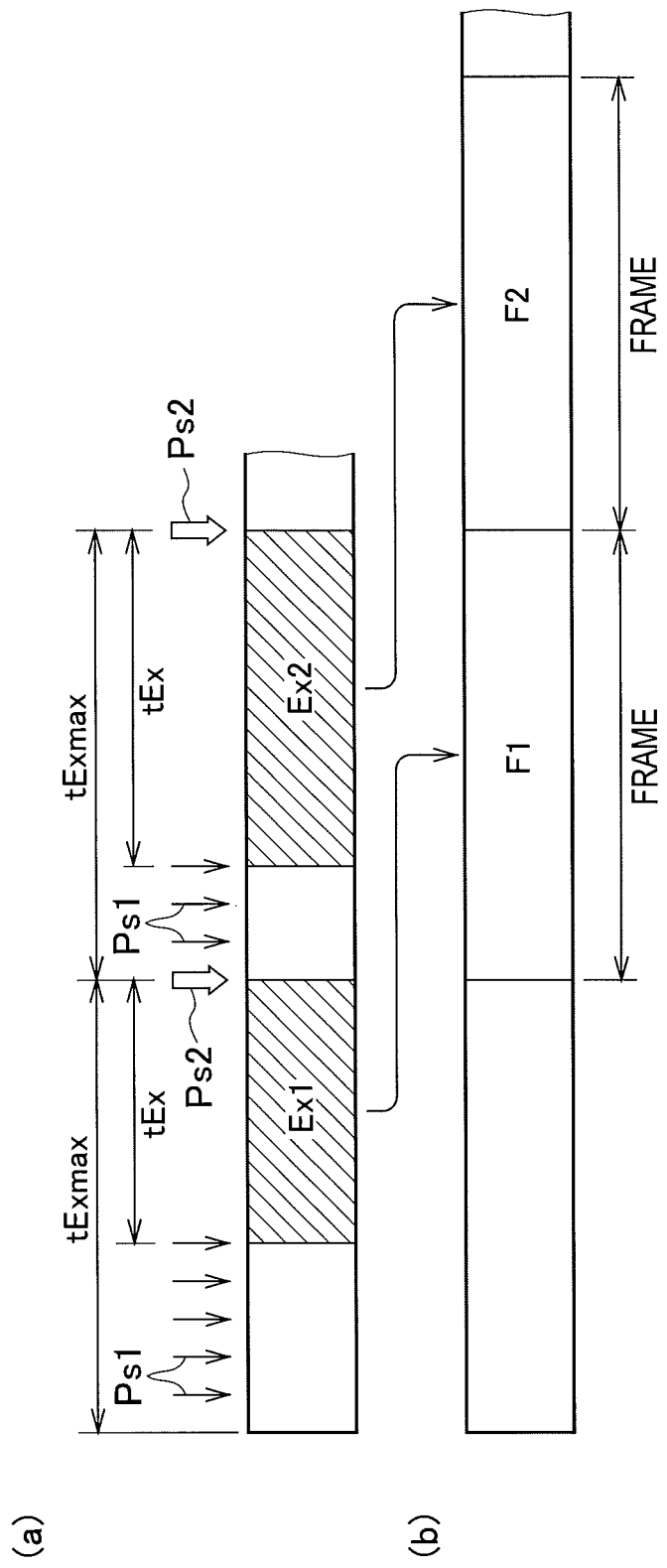
FIG. 6 is a view for describing an operation of reading out exposure and imaging signals of the imaging element 31 shown in FIG. 5.

Item (a) in FIG. 6 indicates exposure of the light-receiving elements Px of the imaging element 31. A maximum exposure time of the light-receiving elements Px is defined as tExmax. The maximum exposure time of tExmax corresponds to one frame period. The exposure time of the light-receiving elements Px varies depending on the pressing speed of a shutter without exceeding the maximum exposure time tExmax.

An extracting pulse Ps1 for releasing electric charges stored by exposure is supplied to the imaging element 31 at horizontal period intervals, for example. When the controller 7 stops supplying the extracting pulse Ps1 at a predetermined point of time, the period after the supply of the extracting pulse Ps1 has stopped is defined as exposure Ex1, Ex2, etc. . . . as indicated by hatching.

A readout pulse Ps2 is supplied to the imaging element 31 at the point when the exposure time reaches the maximum exposure time tExmax. When the readout pulse Ps2 is supplied to the imaging element 31, electric charges stored in the light-receiving elements Px, in the respective lines shown in FIG. 5, are collectively transferred to the vertical transfer registers 3vr.

The vertical transfer registers 3vr sequentially transfer the electric charges transferred from the light-receiving elements Px to the horizontal transfer register 3hr by a vertical transfer clock. The horizontal transfer register 3hr sequentially transfers the electric charges transferred from the respective vertical transfer registers 3vr by a horizontal transfer clock. The electric charges transferred by the horizontal transfer register 3hr are output after being amplified by an output amplifier, and are converted into voltage signals.

As indicated by item (b) in FIG. 6, the imaging element 31 reads out, as voltage signals, the electric charges obtained in each exposure Ex1, Ex2, etc. . . . during one frame period after the readout pulse Ps2 is supplied, so as to output frames F1, F2, etc. . . . of the imaging signals. The imaging signals of the frames F1, F2, etc. . . . are then supplied to an A/D converter 4.

The imaging signals input into the A/D converter 4 are subjected to A/D conversion, and are input into the image processing unit 5. The imaging unit 3 and the A/D converter 4 may be integrated together.

The controller 7 includes a writing-readout controller 70 that controls writing of image data to a frame buffer 50 provided in the image processing unit 5 and controls readout of image data from the frame buffer 50, and a mode switching unit 72 that switches among the normal mode, the intermediate mode, and the night-vision mode. The method of writing the image data onto or reading out the image data from the frame buffer 50 by the writing-readout controller 70 will be described below.

The mode switching unit 72 switches the operations in the image processing unit 5 as appropriate, as described below, corresponding to the normal mode, the intermediate mode, and the night-vision mode. The image processing unit 5 and the controller 7 may be integrated together.

The image processing unit 5 includes the frame buffer 50, switches 51 and 53, a pre-signal processing unit 52, and a demosaicing unit 54. The frame buffer 50 includes memories 50a to 50f, each having a capacity equivalent to one frame. As indicated by the broken lines in FIG. 1, the frame buffer 50 may further include memories 50g to 50i, each having a capacity equivalent to one frame, in addition to the memories 50a to 50f having a total capacity of six frames.

The switches 51 and 53 may be physical switches or may be logical switches for switching the pre-signal processing unit 52 between an active state and an inactive state. The controller 7 receives an image signal input from the image processing unit 5 in order to detect brightness of an image being captured.

Figure 7:
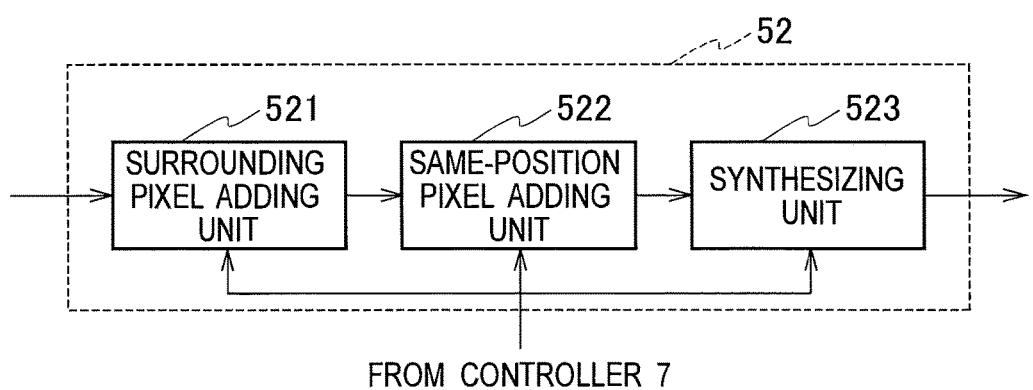
FIG. 7 is a block diagram showing a specific configuration example of a pre-signal processing unit 52 shown in FIG. 1.

As shown in FIG. 7, the pre-signal processing unit 52 includes a surrounding pixel adding unit 521, a same-position pixel adding unit 522, and a synthesizing unit 523.

The image processing unit 5 generates data for the respective three primary colors R, G and B and supplies the data to the image output unit 6. The image output unit 6 outputs the data for the three primary colors in a predetermined format to a display unit or the like (not shown in the drawing).

The image output unit 6 may directly output signals of the three primary colors R, G and B, or may convert the signals of the three primary colors R, G and B into luminance signals and color signals (or color difference signals) before outputting. The image output unit 6 may output composite image signals. The image output unit 6 may output digital image signals or output image signals converted into analog signals by a D/A converter.

In the embodiment, the image output unit 6 includes an NTSC encoder 61 to output NTSC interlaced image signals, based on the instructions of the controller 7. The image output unit 6 may include a PAL encoder for generating PAL image signals in a PAL format, instead of the NTSC encoder 61. The image output unit 6 may be applied to various types of formats, including a high-definition television (HDTV) format.

Next, the operations of each of the normal mode, the intermediate mode and the night-vision mode are described in more detail.

Normal Mode

In the normal mode, the controller 7 directs the drive unit 8 to insert the infrared cut filter 21 between the optical lens 1 and the imaging unit 3. The projection controller 71 turns off the infrared projector 9 to stop projecting infrared light.

Imaging signals captured by the imaging unit 3 are converted into image data as digital signals by the A/D converter 4 and then input into the image processing unit 5. In the normal mode, the mode switching unit 72 connects the switches 51 and 53 to the respective terminals Tb.

As described above, with reference to FIG. 6, the frame F1 of the image signal is obtained based on the exposure Ex1. The frame F2 of the image signal is obtained based on the exposure Ex2. The same operations are repeatedly operated on the following exposures. A frame frequency of the image signals is, for example, 30 frames per second.

The frame frequency of the image signals that may be determined as appropriate are those such as 30 frames per second or 60 frames per second in an NTSC format, and 25 frames per second or 50 frames per second in the PAL format. Alternatively, the frame frequency of the image signals may be 24 frames per second, which is used for movies.

The image data of each frame output from the A/D converter 4 is temporality stored in the frame buffer 50. The image data read out from the frame buffer 50 is input into the demosaicing unit 54 via the switches 51 and 53. The demosaicing unit 54 subjects the image data of each input frame to demosaicing. The image processing unit 5 subjects the data to other types of image processing, such as white balance correction and gain correction, in addition to the demosaicing, and outputs data of the three primary colors R, G, and B.

Figure 8:
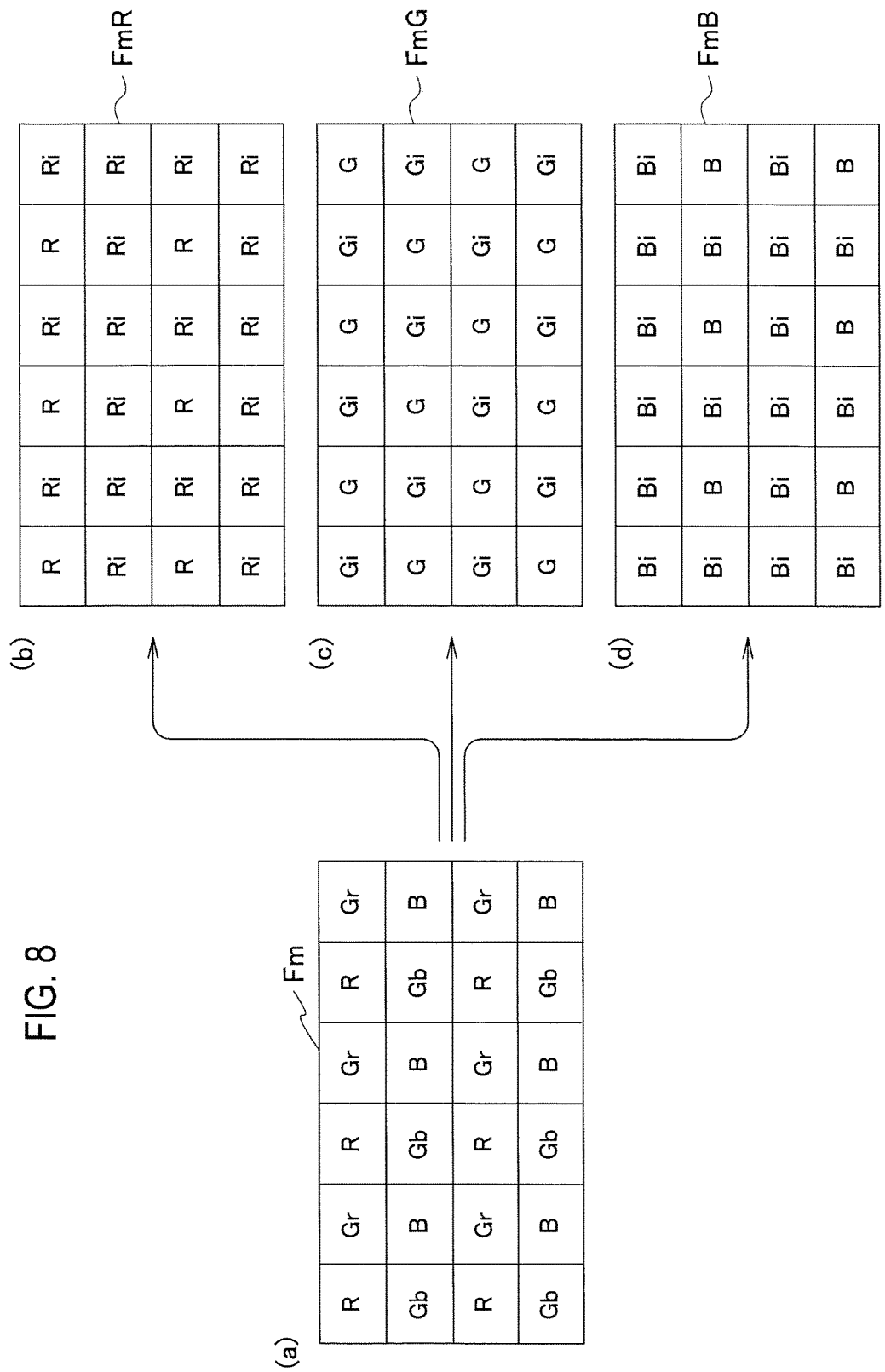
FIG. 8 is a view for describing demosaicing when the imaging device according to the embodiment is operating in a normal mode.

The demosaicing in the demosaicing unit 54 is described below with reference to FIG. 8. Item (a) of FIG. 8 shows an arbitrary frame Fm of image data. The frame Fm is composed of pixels in an effective image period. The number of the pixels is, for example, 640 horizontal pixels and 480 vertical pixels in the VGA standard. For reasons of simplification, the number of the pixels in the frame Fm is greatly decreased so as to schematically show the frame Fm.

The image data generated by the imaging unit 3 having the Bayer array is data in which pixel data for R, G and B are mixed in the frame Fm. The demosaicing unit 54 computes pixel data for R for pixel positions where no pixel data for R is present by use of the surrounding pixel data for R so as to generate interpolated pixel data Ri for R. The demosaicing unit 54 generates R frame FmR in which all pixels in one frame shown in item (b) of FIG. 8 are composed of the pixel data for R.

The demosaicing unit 54 computes pixel data for G for pixel positions where no pixel data for G is present by use of the surrounding pixel data for G so as to generate interpolated pixel data Gi for G. The demosaicing unit 54 generates G frame FmG in which all pixels in one frame shown in item (c) of FIG. 8 are composed of the pixel data for G.

The demosaicing unit 54 computes pixel data for B for pixel positions where no pixel data for B is present by use of the surrounding pixel data for B so as to generate interpolated pixel data Bi for B. The demosaicing unit 54 generates B frame FmB in which all pixels in one frame shown in item (d) of FIG. 8 are composed of the pixel data for B.

The demosaicing unit 54 is only required to use at least the pixel data for R when interpolating the pixel data for R, use at least the pixel data for G when interpolating the pixel data for G, and use at least the pixel data for B when interpolating the pixel data for B. Alternatively, the demosaicing unit 54 may interpolate the pixel data for each of R, G and B to be generated by use of the pixel data of the different colors in order to improve the accuracy of the interpolation.

Since the imaging unit 3 further includes pixels outside the effective image period, pixel data for each of R, G and B can be interpolated with regard to the pixels located along the edges of top and bottom, left and right.

The R frame FmR, the G frame FmG and the B frame FmB generated by the demosaicing unit 54 are output as the data for the three primary colors R, G and B. Although the pixel data for each of R, G and B was described per frame in FIG. 8 for ease of explanation, the pixel data for each of R, G and B is actually output sequentially per pixel.

Intermediate Mode: First Intermediate Mode

In the intermediate mode (first intermediate mode and second intermediate mode described below), the controller 7 directs the drive unit 8 to insert the dummy glass 22 between the optical lens 1 and the imaging unit 3. The projection controller 71 turns on the infrared projector 9 to project infrared light. The mode switching unit 72 connects the switches 51 and 53 to the respective terminals Ta.

Figure 9:
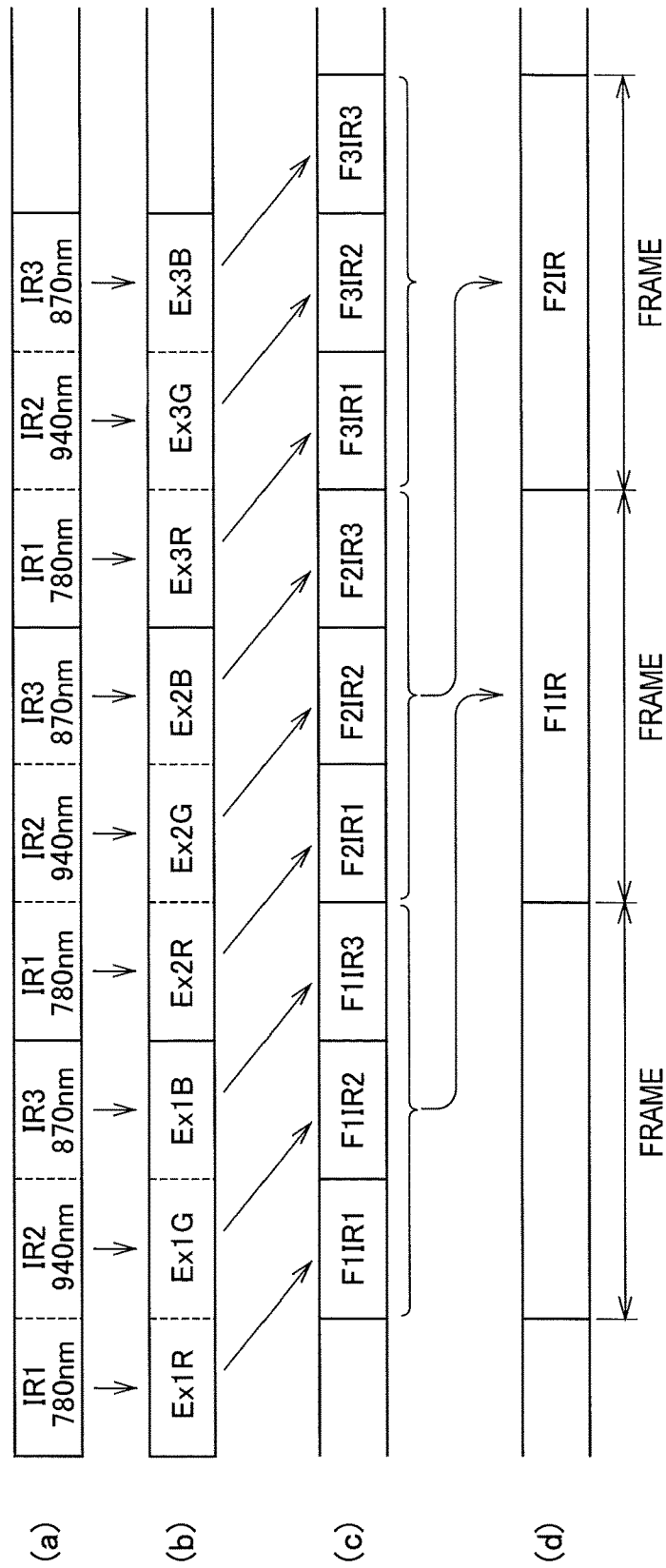
FIG. 9 is a view showing a relationship between exposures and frames of image signals when the imaging device according to the embodiment is operating in an intermediate mode and in a night-vision mode.

Item (a) of FIG. 9 shows a state where infrared light is projected from the infrared projector 9. The controller 7 divides one frame period of the normal mode into three so as to control, for example, the projecting portions 91, 92 and 93 to sequentially project infrared light in this order.

In the example of item (a) of FIG. 9, the infrared light with the wavelength IR1 (780 nm) is radiated on the object in the first ⅓ period of the one frame. The infrared light with the wavelength IR2 (940 nm) is radiated on the object in the second ⅓ period of the one frame. The infrared light with the wavelength IR3 (870 nm) is radiated on the object in the last ⅓ period of the one frame. The order of radiation of the infrared light with the respective wavelengths IR1, IR2 and IR3 is optional.

As shown in item (b) of FIG. 9, exposure Ex1R which has a strong correlation with R light is executed by the imaging unit 3 at the point where the infrared light with the wavelength IR1 is being projected. Exposure Ex1G which has a strong correlation with G light is executed by the imaging unit 3 at the point where the infrared light with the wavelength IR2 is being projected. Exposure Ex1B which has a strong correlation with B light is executed by the imaging unit 3 at the point where the infrared light with the wavelength IR3 is being projected.

Note that, since an image is captured in the intermediate mode in a state where visible light is slightly present, visible light and infrared light projected from the infrared projector 9 coexist. Therefore, in the intermediate mode, exposures Ex1R, Ex1G, Ex1B, Ex2R, Ex2G, Ex2B, etc., are each obtained in a manner such that exposure of visible light and exposure of infrared light are combined together.

As shown in item (c) of FIG. 9, frame F1IR1 corresponding to the exposure Ex1R, frame F1IR2 corresponding to the exposure Ex1G and frame F1IR3 corresponding to the exposure Ex1B are obtained based on the exposures Ex1R, Ex1G and Ex1B after a predetermined period of time.

Further, frame F2IR1 corresponding to the exposure Ex2R, frame F2IR2 corresponding to the exposure Ex2G and frame F2IR3 corresponding to the exposure Ex2B are obtained based on the exposures Ex2R, Ex2G and Ex2B after a predetermined period of time. The same operations are repeated after the exposures Ex3R, Ex3G, and Ex3B.

The frame frequency of the imaging signals in item (c) of FIG. 9 is 90 frames per second. In the intermediate mode, one frame of the image signals in the normal mode is subjected to time division so as to project the infrared light with the respective wavelengths IR1 to IR3. Thus, in order to output the image signals in the same format as the normal mode, the frame frequency of the imaging signals in item (c) of FIG. 9 is three times as many as that in the normal mode.

As described below, based on the imaging signals of the three frames in item (c) of FIG. 9, one frame of image signals having a frame frequency of 30 frames per second as shown in item (d) of FIG. 9 is generated. Schematic image signals in a progressive format are described below, instead of image signals in an interlaced format. For example, frame F1IR is generated based on the frames F1IR1, F1IR2, and F1IR3. Frame F2IR is generated based on the frames F2IR1, F2IR2, and F2IR3.

The operation of generating the image signals of each frame in item (d) of FIG. 9 in the intermediate mode based on the imaging signals of the three frames in item (c) of FIG. 9, is described in detail below.

The image data output from the A/D converter 4 for the respective frames corresponding to the imaging signals shown in item (c) of FIG. 9, is temporality stored in the frame buffer 50. The image data read out from the frame buffer 50 is input into the pre-signal processing unit 52 via the switch 51.

Figure 10:
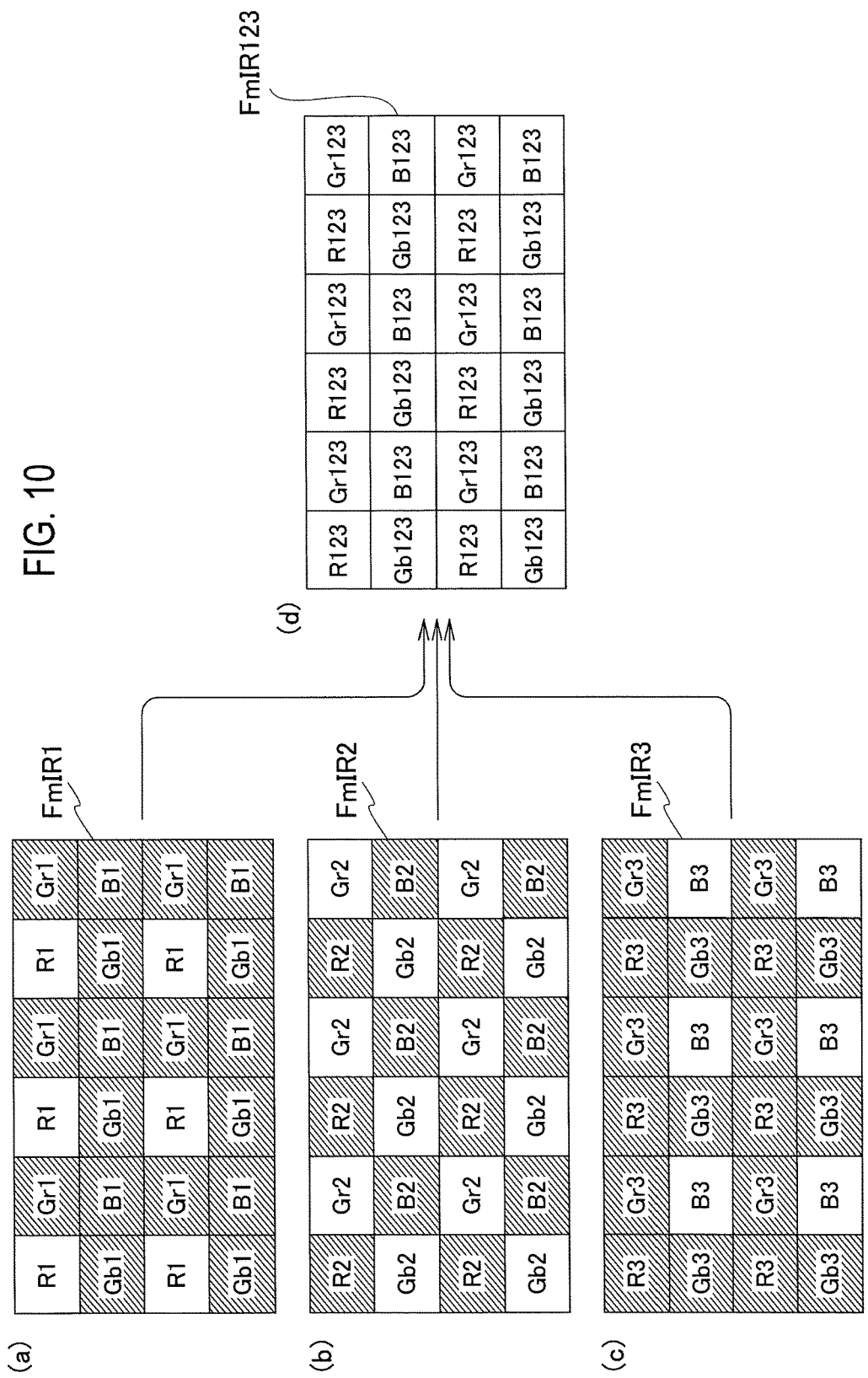
FIG. 10 is a view for describing pre-signal processing when the imaging device according to the embodiment is operating in a first intermediate mode.

Pre-signal processing in the pre-signal processing unit 52 is described below with reference to FIG. 10. Item (a) of FIG. 10 shows an arbitrary frame FmIR1 of image data generated at the point where the infrared light with the wavelength IR1 is being projected. The pixel data for each of R, B, Gr and Gb in the frame FmIR1 is added with an index "1" indicating that all data is generated in the state where the infrared light with the wavelength IR1 is projected.

Item (b) of FIG. 10 shows an arbitrary frame FmIR2 of image data generated at the point where the infrared light with the wavelength IR2 is being projected. The pixel data for each of R, B, Gr and Gb in the frame FmIR2 is added with an index "2" indicating that all data is generated in the state where the infrared light with the wavelength IR2 is projected.

Item (c) of FIG. 10 shows an arbitrary frame FmIR3 of image data generated at the point where the infrared light with the wavelength IR3 is being projected. The pixel data for each of R, B, Gr and Gb in the frame FmIR3 is added with an index "3" indicating that all data is generated in the state where the infrared light with the wavelength IR3 is projected.

Since the frame FmIR1 shown in item (a) of FIG. 10 includes the image data generated in the state where the infrared light with the wavelength IR1 having a strong correlation with R light is projected, the pixel data for R is pixel data corresponding to the projected infrared light, and the pixel data for B and G are pixel data not corresponding to the projected infrared light. The hatching added to the pixel data for each of B, Gr and Gb represents that the pixel data does not correspond to the projected infrared light.

Since the frame FmIR2 shown in item (b) of FIG. 10 includes the image data generated in the state where the infrared light with the wavelength IR2 having a strong correlation with G light is projected, the pixel data for G is pixel data corresponding to the projected infrared light, and the pixel data for R and B are pixel data not corresponding to the projected infrared light. The hatching added to the pixel data for each of R and B represents that the pixel data does not correspond to the projected infrared light.

Since the frame FmIR3 shown in item (c) of FIG. 10 includes the image data generated in the state where the infrared light with the wavelength IR3 having a strong correlation with B light is projected, the pixel data for B is pixel data corresponding to the projected infrared light, and the pixel data for R and G are pixel data not corresponding to the projected infrared light. The hatching added to the pixel data for each of R, Gr and Gb represents that the pixel data does not correspond to the projected infrared light.

The same-position pixel adding unit 522 in the pre-signal processing unit 52 individually adds the pixel data for each of R, Gr, Gb and B located at the same pixel positions according to the following formulae (1) to (3) so as to generate added pixel data R123, Gr123, Gb123, and B123. In the intermediate mode, the surrounding pixel adding unit 521 in the pre-signal processing unit 52 is inactive.

$$R123 = ka \times R1 + Kb \times R2 + kc \times R3 \quad (1)$$

$$G123 = kd \times G1 + Ke \times G2 + kf \times G3 \quad (2)$$

$$B123 = kg \times B1 + Kh \therefore B2 + ki \times B3 \quad (3)$$

In the formulae (1) to (3), R1, G1 and B1 are pixel data for R, G and B in the frame FmIR1, R2, G2 and B2 are pixel data for R, G and B in the frame FmIR2, and R3, G3 and B3 are pixel data for R, G and B in the frame FmIR3. In addition, ka to ki are predetermined coefficients. The data G123 in the formula (2) is either Gr123 or Gb123.

The same-position pixel adding unit 522 adds the hatched pixel data for each of R, Gr, Gb and B to the pixel data for each of R, Gr, Gb and B located at the same pixel positions not hatched.

In particular, the same-position pixel adding unit 522 adds, to the pixel data for R located in the frame FmIR1, the pixel data for R located at the same pixel positions in each of the frames FmIR2 and FmIR3 so as to generate the added pixel data R123 according to the formula (1). That is, the same-position pixel adding unit 522 only uses the pixel data in the region corresponding to the red color filter in the light receiving elements and generates the added pixel data R123 for red.

The same-position pixel adding unit 522 adds, to the pixel data for Gr, Gb located in the frame FmIR2, the pixel data for Gr, Gb located at the same pixel positions in each of the frames FmIR1 and FmIR3 so as to generate the added pixel data G123 according to the formula (2). That is, the same-position pixel adding unit 522 only uses the pixel data in the region corresponding to the green color filter in the light receiving elements and generates the added pixel data G123 for green.

The same-position pixel adding unit 522 adds, to the pixel data for B located in the frame FmIR3, the pixel data for B located at the same pixel positions in each of the frames FmIR1 and FmIR2 so as to generate the added pixel data B123 according to the formula (3). That is, the same-position pixel adding unit 522 only uses the pixel data in the region corresponding to the blue color filter in the light receiving elements and generates the added pixel data B123 for blue.

The synthesizing unit 523 in the pre-signal processing unit 52 generates frame FmIR123 of synthesized image signals shown in item (d) of FIG. 10 based on the respective added pixel data R123, Gr123, Gb123 and B123 generated at the respective pixel positions.

More particularly, the synthesizing unit 523 selects the added pixel data R123 in the frame FmIR1, the added pixel data Gr123 and Gb123 in the frame FmIR2, and the added pixel data B123 in FmIR3 and synthesizes the respective added pixel data. The synthesizing unit 523 thus generates the frame FmIR123 of the synthesized image signals.

As described above, the synthesizing unit 523 generates the frame FmIR123 in which the respective added pixel data R123, Gr123, Gb123 and B123 are arranged so as to have the same array as the filter elements in the color filter 32.

In the first intermediate mode, the image data in the frame FmIR123 are generated in such a manner as to use the pixel data not hatched and the pixel data hatched.

The reason the same-position pixel adding unit 522 adds the respective pixel data located at the same pixel positions is that, since an image is captured in the intermediate mode in the state where visible light is present, although the amount thereof is small, the hatched pixel data contains the components of the respective colors based on the exposure by the visible light. Therefore, the respective pixel data located at the same pixel positions are added to each other so that the sensitivity to the respective colors can be improved.

When the amount of visible light is relatively large in the state where visible light and infrared light coexist, the exposure by the visible light is predominant. In such a case, the image data in the frame FmIR123 mainly contains the components based on the image signals exposed by the visible light. When the amount of infrared light is relatively large in the state where infrared light and visible light coexist, the exposure by the infrared light is predominant. In such a case, the image data in the frame FmIR123 mainly contains the components based on the image signals exposed by the infrared light.

When the amount of visible light is relatively small, the coefficients ka, kb and kc in the formula (1) preferably fulfill the relationship of ka>kb, kc, the coefficients kd, ke and kf in the formula (2) preferably fulfill the relationship of kf>kd, ke, and the coefficients kg, kh and ki in the formula (3) preferably fulfill the relationship of kh>kg, ki. This is because the wavelength IR1 has a strong correlation with the R light, the wavelength IR2 has a strong correlation with the G light, and the wavelength IR3 has a strong correlation with the B light.

Accordingly, the pixel data for R can be the main data in the frame FmIR1, the pixel data for G can be the main data in the frame FmIR2, and the pixel data for B can be the main data in the frame FmIR3.

The image data in the frame FmIR123 output from the pre-signal processing unit 52 is input into the demosaicing unit 54 via the switch 53. The demosaicing unit 54 subjects the input image data in the frame FmIR123 to demosaicing in the same manner as the normal mode. The image processing unit 5 subjects the image data to other types of image processing, such as white balance correction and gain correction, in addition to the demosaicing, and then outputs the data for the three primary colors R, G and B.

Figure 11:
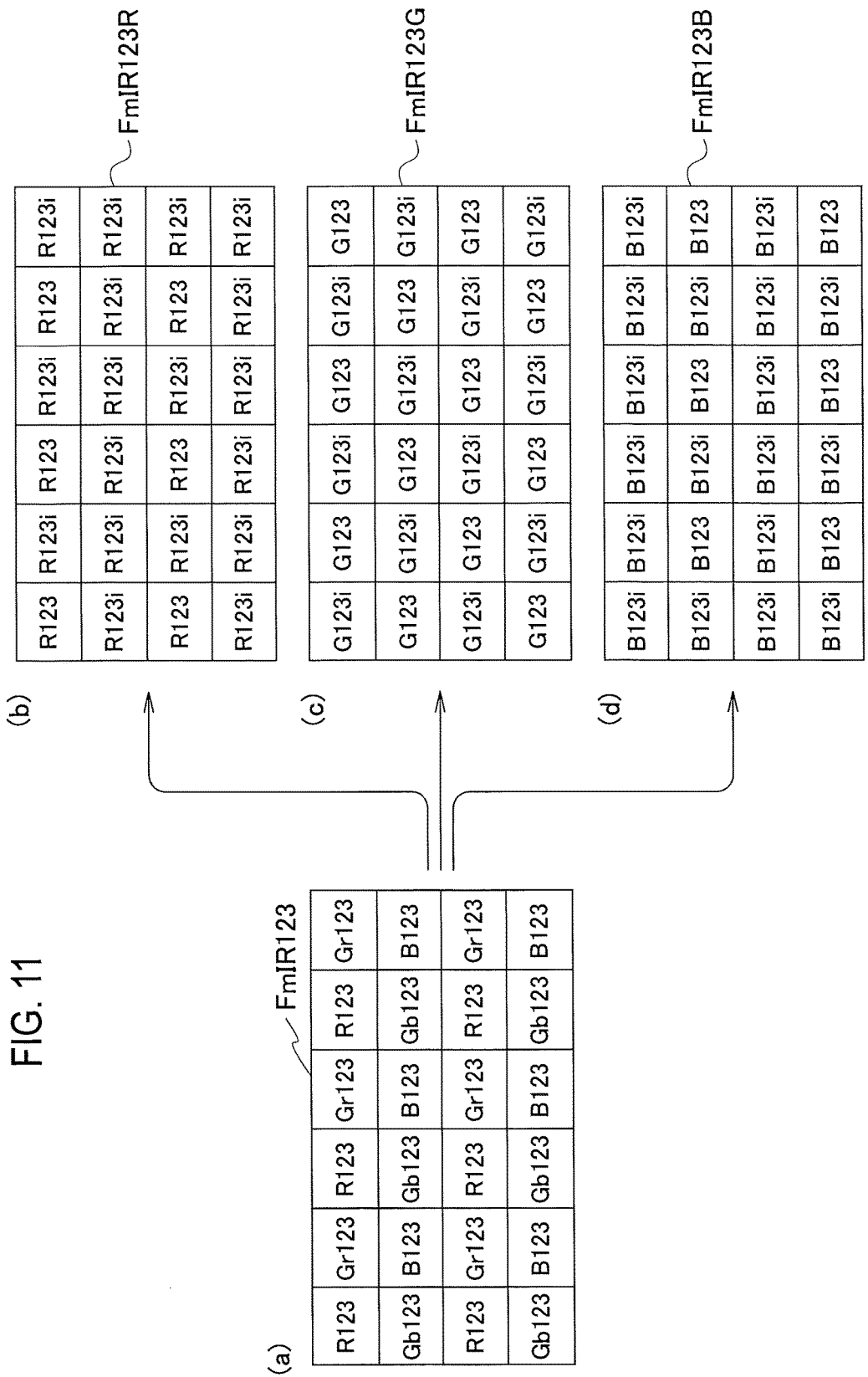
FIG. 11 is a view for describing demosaicing when the imaging device according to the embodiment is operating in the first intermediate mode.

The demosaicing in the demosaicing unit 54 is described below with reference to FIG. 11. Item (a) of FIG. 11 shows the frame FmIR123. The demosaicing unit 54 computes pixel data for R for pixel positions where no pixel data for R is present by use of the surrounding pixel data for R so as to generate interpolated pixel data R123i for R. The demosaicing unit 54 generates R frame FmIR123R in which all pixels in one frame shown in item (b) of FIG. 11 are composed of the pixel data for R.

The demosaicing unit 54 computes pixel data for G for pixel positions where no pixel data for G is present by use of the surrounding pixel data for G so as to generate interpolated pixel data G123i for G. The demosaicing unit 54 generates G frame FmIR123G in which all pixels in one frame shown in item (c) of FIG. 11 are composed of the pixel data for G.

The demosaicing unit 54 computes pixel data for B for pixel positions where no pixel data for B is present by use of the surrounding pixel data for B so as to generate interpolated pixel data B123i for B. The demosaicing unit 54 generates B frame FmIR123B in which all pixels in one frame shown in item (d) of FIG. 11 are composed of the pixel data for B.

As is apparent from the operation of the demosaicing unit 54 in the normal mode shown in FIG. 8 and the operation of the demosaicing unit 54 in the intermediate mode shown in FIG. 11, both operations are substantially the same. Thus, the operation of the demosaicing unit 54 does not differ between the normal mode and the intermediate mode.

The pre-signal processing unit 52 is only required to be activated in the intermediate mode except for the surrounding pixel adding unit 521, while the pre-signal processing unit 52 is inactivated in the normal mode. The normal mode and the intermediate mode may share the demosaicing unit 54 in the image processing unit 5 and the signal processing unit implementing processing such as white balance correction and gain correction.

Intermediate Mode: Second Intermediate Mode

Figure 12:
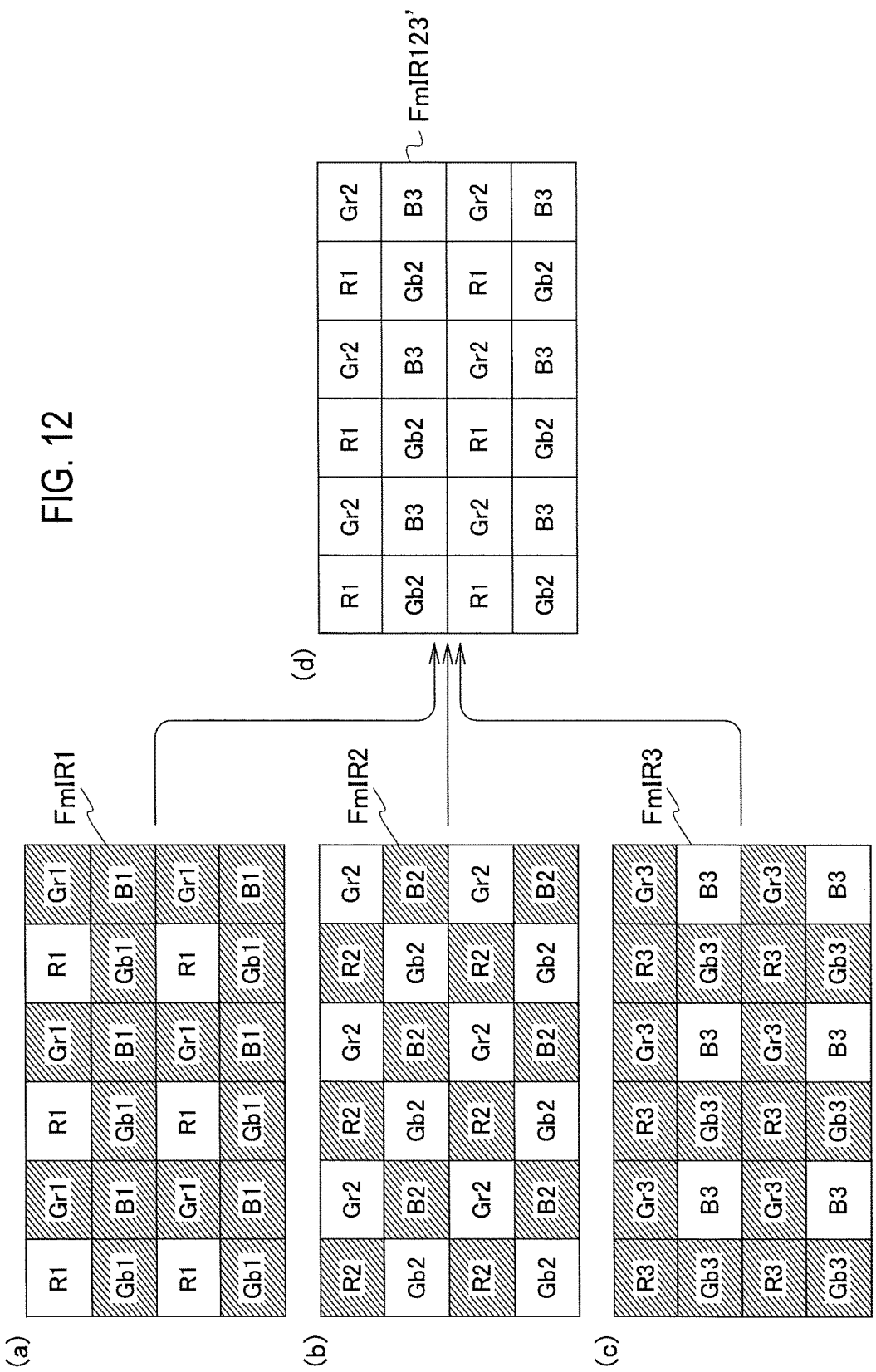
FIG. 12 is a view for describing pre-signal processing when the imaging device according to the embodiment is operating in a second intermediate mode.
Figure 13:
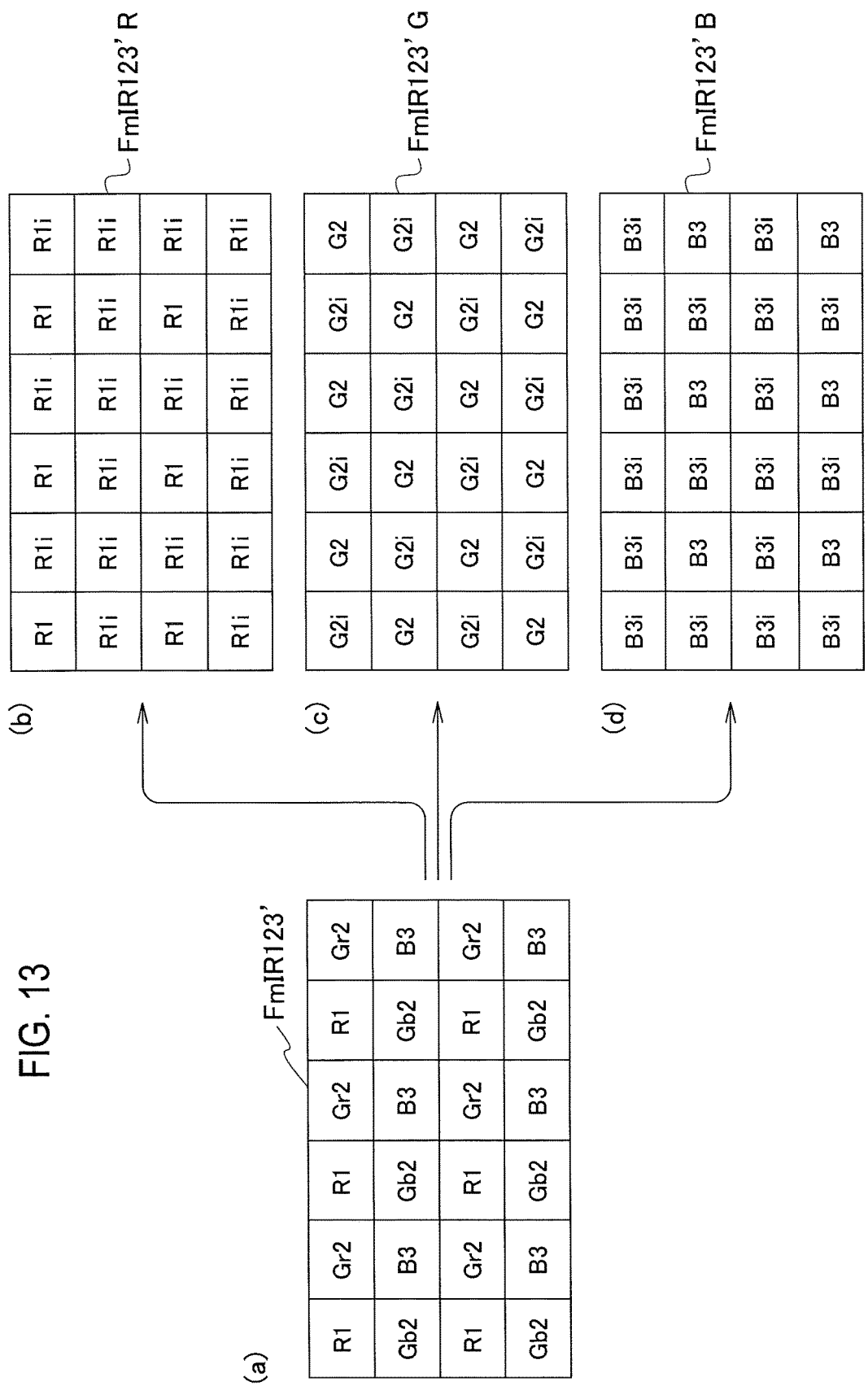
FIG. 13 is a view for describing demosaicing when the imaging device according to the embodiment is operating in the second intermediate mode.

Operations in the second intermediate mode are described below with reference to FIG. 12 and FIG. 13. Note that the same operations as those in the first intermediate mode are not repeated in the second intermediate mode. Here, the frame FmIR1, the frame FmIR2 and the frame FmIR3 shown in items (a) to (c) in FIG. 12 are the same as the frame FmIR1, the frame FmIR2 and the frame FmIR3 shown in items (a) to (c) in FIG. 10.

The synthesizing unit 523 selects pixel data R1 for R in the frame FmIR1, pixel data Gr2 and Gb2 for G in the frame FmIR2, and pixel data B3 for B in FmIR3 and synthesizes the respective pixel data. The synthesizing unit 523 thus generates frame FmIR123' of the synthesized image signals shown in item (d) of FIG. 12.

That is, the frame FmIR123' is image data in which the pixel data for R, Gr, Gb and B not hatched in each of the frames FmIR1, FmIR2 and FmIR3 are collected in one frame.

Thus, the frame FmIR123' contains the pixel data for red only using the pixel data in the region corresponding to the red color filter in the state where the infrared light with the wavelength IR1 is projected, the pixel data for green only using the pixel data in the region corresponding to the green color filter in the state where the infrared light with the wavelength IR2 is projected, and the pixel data for blue only using the pixel data in the region corresponding to the blue color filter in the state where the infrared light with the wavelength IR3 is projected.

As described above, the synthesizing unit 523 generates the frame FmIR123' in which the respective pixel data R1, Gr2, Gb2 and B3 are arranged so as to have the same array as the filter elements in the color filter 32.

In the second intermediate mode, the same-position pixel adding unit 522 defines the coefficient Ka in the formula (1) as 1 and the other coefficients Kb and Kc as 0, defines the coefficient ke in the formula (2) as 1 and the other coefficients kd and kf as 0, and defines the coefficient ki in the formula (3) as 1 and the other coefficients kg and kh as 0.

Therefore, the value of the pixel data for R in the frame FmIR1, the values of the pixel data for Gr and Gb in the frame FmIR2 and the value of the pixel data for B in the frame FmIR3 each remain as is.

Accordingly, the synthesizing unit 523 can generate the frame FmIR123' by selecting the pixel data for R in the frame FmIR1, the pixel data for Gr and Gb in the frame FmIR2 and the pixel data for B in the frame FmIR3, in the same manner as the operations in the first intermediate mode.

In the second intermediate mode, the pre-signal processing unit 52 only uses the pixel data (the pixel data not hatched) generated in the state where the infrared light for generating the pixel data with the same color is projected so as to generate the frame FmIR123'.

According to the second intermediate mode, although the sensitivity or color reproduction performance decreases compared with the first intermediate mode, the calculation processing can be simplified or the frame memory can be reduced.

The demosaicing in the demosaicing unit 54 is described below with reference to FIG. 13. Item (a) of FIG. 13 shows the frame FmIR123'. The demosaicing unit 54 computes pixel data for R for pixel positions where no pixel data for R is present by use of the surrounding pixel data for R so as to generate interpolated pixel data R1$i$ for R. The demosaicing unit 54 generates R frame FmIR123'R in which all pixels in one frame shown in item (b) of FIG. 13 are composed of the pixel data for R.

The demosaicing unit 54 computes pixel data for G for pixel positions where no pixel data for G is present by use of the surrounding pixel data for G so as to generate interpolated pixel data G2$i$ for G. The demosaicing unit 54 generates G frame FmIR123'G in which all pixels in one frame shown in item (c) of FIG. 13 are composed of the pixel data for G.

The demosaicing unit 54 computes pixel data for B for pixel positions where no pixel data for B is present by use of the surrounding pixel data for B so as to generate interpolated pixel data B3$i$ for B. The demosaicing unit 54 generates B frame FmIR123'B in which all pixels in one frame shown in item (d) of FIG. 13 are composed of the pixel data for B.

Accordingly, in the intermediate mode, the pixel data for red is generated from the pixel data obtained from the region corresponding to the red color filter in the light receiving elements, the pixel data for green is generated from the pixel data obtained from the region corresponding to the green color filter in the light receiving elements, and the pixel data for blue is generated from the pixel data obtained from the region corresponding to the blue color filter in the light receiving elements.

Night-vision Mode: First Night-vision Mode

In the night-vision mode (first night-vision mode and second night-vision mode described below), the controller 7 directs the drive unit 8 to insert the dummy glass 22 between the optical lens 1 and the imaging unit 3, as in the case of the intermediate mode. The projection controller 71 turns on the infrared projector 9 to project infrared light. The mode switching unit 72 connects the switches 51 and 53 to the respective terminals Ta.

The general operations in the night-vision mode are the same as those shown in FIG. 9. However, since an image is captured in the night-vision mode in a state where almost no visible light is present, the exposures Ex1R, Ex1G, Ex1B, Ex2R, Ex2G, Ex2B, etc., shown in item (b) of FIG. 9 are assumed to be exposure only by infrared light.

Under the condition that there is almost no visible light but only infrared light, the characteristics of the respective filter elements in the color filter 32 do not differ from each other. Thus, the imaging unit 3 can be considered as a single-color imaging device.

Therefore, in the night-vision mode, the surrounding pixel adding unit 521 in the pre-signal processing unit 52 adds surrounding pixel data to all pixel data in order to improve the sensitivity of infrared light.

More particularly, when the R pixel is the target pixel as shown in item (a) of FIG. 14, the surrounding pixel adding unit 521 adds, to the pixel data for R as the target pixel, the pixel data of the surrounding eight pixels of G and B.

That is, while the pixel data for red is generated from the pixel data obtained from the region corresponding to the red color filter in the light receiving elements in the intermediate mode, the pixel data for red is generated, in the night-vision mode, from the pixel data obtained from a wider region than the region in the intermediate mode. The respective examples shown in items (a) to (c) of FIG. 14 use the pixel data obtained from the region of the nine pixels including the target pixel.

When the G pixel is the target pixel as shown in item (b) of FIG. 14, the surrounding pixel adding unit 521 adds, to the pixel data for G as the target pixel, the pixel data of the surrounding eight pixels of R, G and B. The target pixel G shown in item (b) of FIG. 14 is a pixel of Gb, and other surrounding pixels G are pixels of Gr. Although not shown in the drawing, when the target pixel G is a pixel of Gr, other surrounding pixels G are pixels of Gb, and the surrounding pixel adding unit 521 adds, to the pixel data for Gr, the pixel data of the surrounding eight pixels of R, Gb and B.

That is, while the pixel data for green is generated from the pixel data obtained from the region corresponding to the green color filter in the light receiving elements in the intermediate mode, the pixel data for green is generated, in the night-vision mode, from the pixel data obtained from a wider region than the region in the intermediate mode.

When the B pixel is a target pixel as shown in item (c) of FIG. 14, the surrounding pixel adding unit 521 adds, to the pixel data for B as the target pixel, the pixel data of the surrounding eight pixels of R and G.

That is, while the pixel data for blue is generated from the pixel data obtained from the region corresponding to the blue color filter in the light receiving elements in the intermediate mode, the pixel data for blue is generated, in the night-vision mode, from the pixel data obtained from a wider region than the region in the intermediate mode.

The surrounding pixel adding unit 521 may simply add the pixel data of the nine pixels together including the target pixel and the surrounding eight pixels, or may add, to the pixel data of the target pixel, the pixel data of the surrounding eight pixels after being subjected to particular weighting processing.

Here, there is a known imaging element capable of reading out a plurality of pixels as a single pixel, which is called binning. When the imaging element possessing the binning function is used as the imaging element 31, the adding processing may be performed not by the surrounding pixel adding unit 521 but by the imaging element with this binning function. The binning processing by the imaging element is substantially equivalent to the adding processing by the surrounding pixel adding unit 521.

Figure 15:
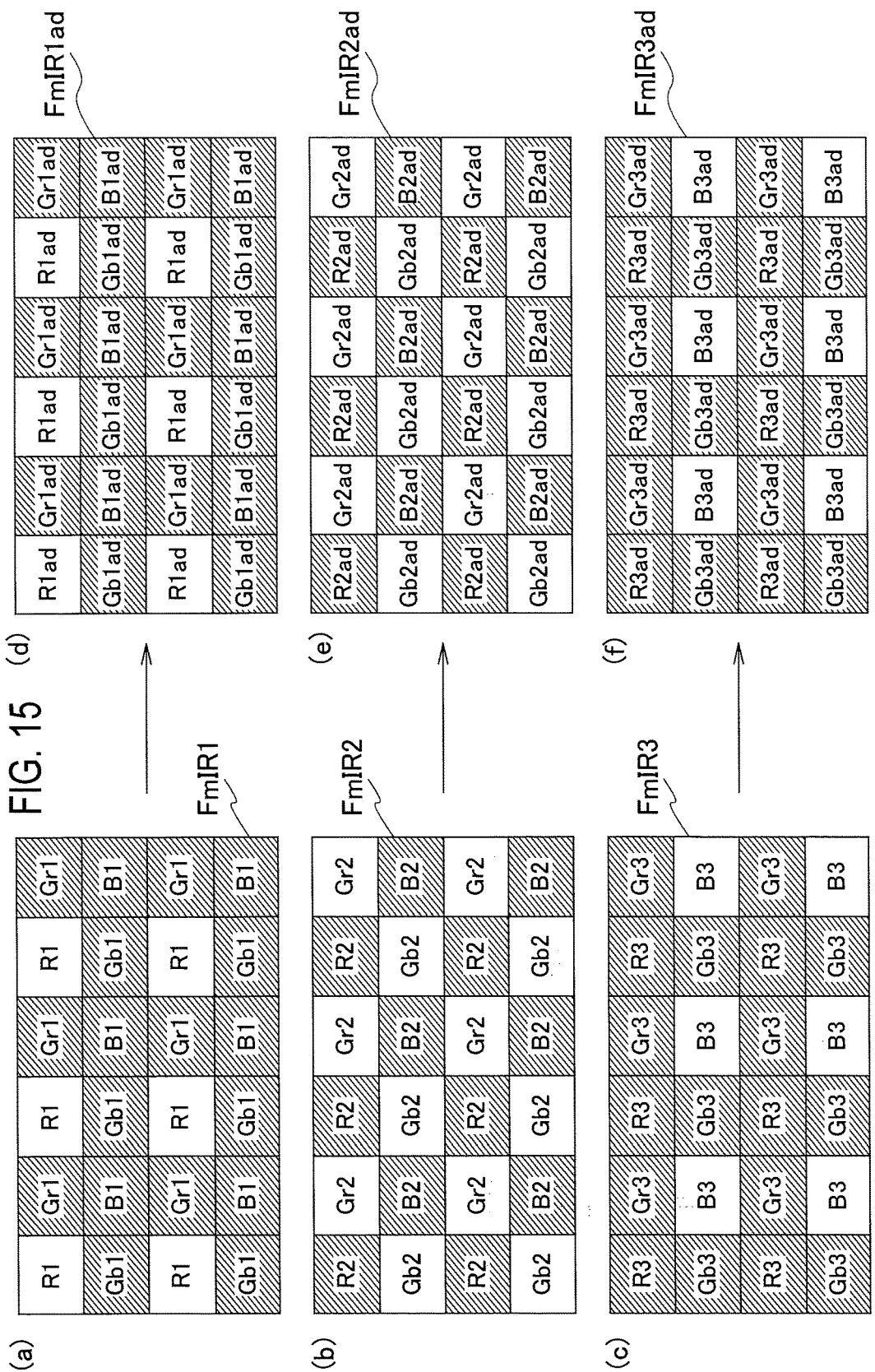
FIG. 15 is a view showing frames on which processing of adding surrounding pixels is performed.

The frame FmIR1, the frame FmIR3, and the frame FmIR2 shown in items (a) to (c) of FIG. 15 are the same as the frame FmIR1, the frame FmIR3, and the frame FmIR2 shown in items (a) to (c) of FIG. 10, respectively. In items (d) to (f) of FIG. 15, each of added pixel data R1*ad*, Gr1*ad*, Gb1*ad*, B1*ad*, R2*ad*, Gr2*ad*, Gb2*ad*, B2*ad*, R3*ad*, Gr3*ad*, Gb3*ad* and B3*ad* is obtained in a manner such that the pixel data of the surrounding eight pixels are added to the pixel data for each of R, Gr, Gb, and B.

The surrounding pixel adding unit 521 subjects the pixel data in each of the frames FmIR1, FmIR3 and FmIR2 to adding processing shown in FIG. 14 so as to generate frame FmIR1*ad*, frame FmIR2*ad* and frame FmIR3*ad* shown in items (d) to (f) of FIG. 15.

Figure 16:
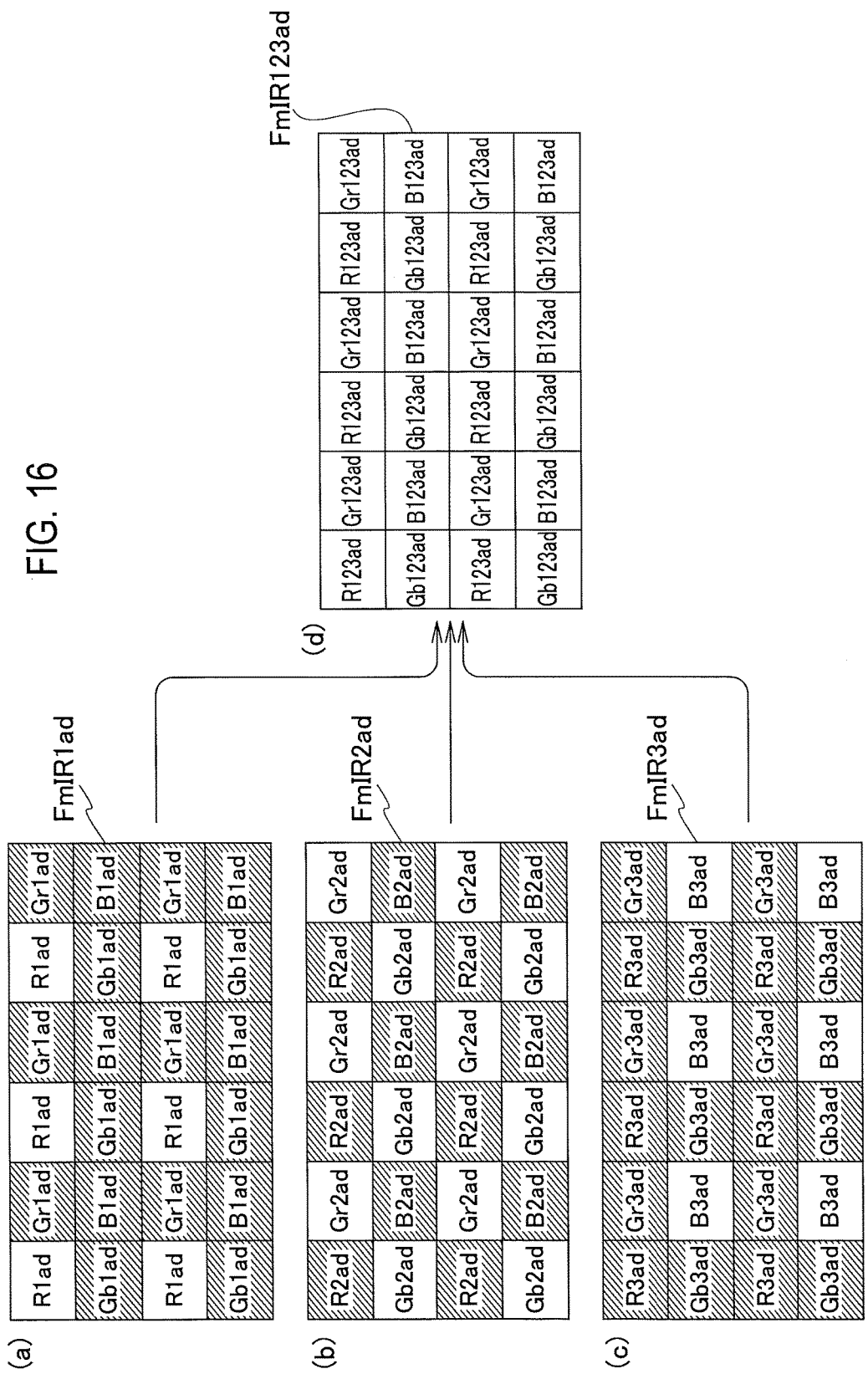
FIG. 16 is a view for describing pre-signal processing when the imaging device according to the embodiment is operating in a first night-vision mode.

The frames FmIR1*ad*, FmIR2*ad* and FmIR3*ad* shown in items (a) to (c) of FIG. 16 are the same as the frames FmIR1*ad*, FmIR2*ad* and FmIR3*ad* shown in items (d) to (f) of FIG. 15, respectively.

As in the case of the first intermediate mode, the same-position pixel adding unit 522 adds, to the pixel data R1*ad* located in the frame FmIR1*ad*, the pixel data R2*ad* and R3*ad* located at the same pixel positions in the respective frames FmIR2*ad* and FmIR3*ad* so as to generate added pixel data R123*ad* according to the formula (1).

The same-position pixel adding unit 522 adds, to the pixel data Gr2*ad*, Gb2*ad* located in the frame FmIR2*ad*, the pixel data Gr1*ad*, Gb1*ad*, Gr3*ad*, and Gb3*ad* located at the same pixel positions in the respective frames FmIR1*ad* and FmIR3*ad* so as to generate added pixel data Gr123*ad* and Gb123*ad* according to the formula (2).

The same-position pixel adding unit 522 adds, to the pixel data B3*ad* located in the frame FmIR3*ad*, the pixel data B1*ad* and B2*ad* located at the same pixel positions in the respective frames FmIR1*ad* and FmIR2*ad* so as to generate added pixel data B123*ad* according to the formula (3).

As in the case of the first intermediate mode, the synthesizing unit 523 selects the added pixel data R123*ad* in the frame FmIR1*ad*, the added pixel data Gr123*ad* and Gb123*ad* in the frame FmIR2*ad* and the added pixel data B123*ad* in FmIR3*ad* and synthesizes the respective added pixel data. The synthesizing unit 523 thus generates frame FmIR123*ad* of the synthesized image signals shown in item (d) of FIG. 16.

The synthesizing unit 523 generates the frame FmIR123*ad* in which the respective added pixel data R123*ad*, Gr123*ad*, Gb123*ad* and B123*ad* are arranged so as to have the same array as the filter elements in the color filter 32.

Figure 17:
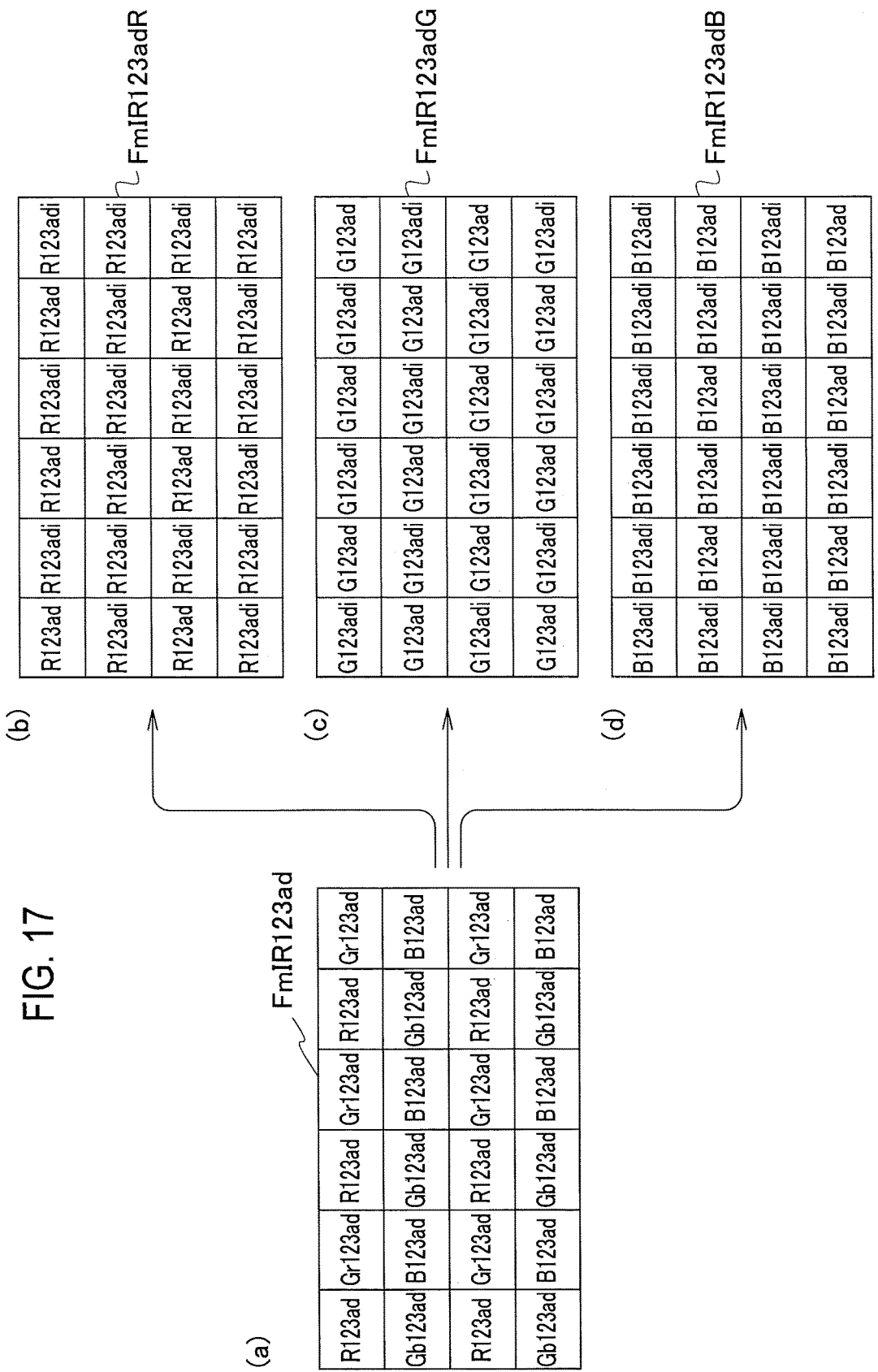
FIG. 17 is a view for describing demosaicing when the imaging device according to the embodiment is operating in the first night-vision mode.

Item (a) of FIG. 17 shows the frame FmIR123*ad*. The demosaicing unit 54 computes pixel data for R for pixel positions where no pixel data for R is present by use of the surrounding pixel data for R so as to generate interpolated pixel data R123*adi* for R. The demosaicing unit 54 generates R frame FmIR123*ad*R in which all pixels in one frame shown in item (b) of FIG. 17 are composed of the pixel data for R.

The demosaicing unit 54 computes pixel data for G for pixel positions where no pixel data for G is present by use of the surrounding pixel data for G so as to generate interpolated pixel data G123*adi* for G. The demosaicing unit 54 generates G frame FmIR123*ad*G in which all pixels in one frame shown in item (c) of FIG. 17 are composed of the pixel data for G.

The demosaicing unit 54 computes pixel data for B for pixel positions where no pixel data for B is present by use of the surrounding pixel data for B so as to generate interpolated pixel data B123*adi* for B. The demosaicing unit 54 generates B frame FmIR123*ad*B in which all pixels in one frame shown in item (d) of FIG. 17 are composed of the pixel data for B.

The first intermediate mode and the first night-vision mode differ from each other in that the surrounding pixel adding unit 521 is inactive in the first intermediate mode, and the surrounding pixel adding unit 521 is active in the first night-vision mode. The mode switching unit 72 is only required to activate the surrounding pixel adding unit 521 when in the night-vision mode.

The operation of the demosaicing unit 54 in the night-vision mode is substantially the same as that in the normal mode and in the intermediate mode. The normal mode, the intermediate mode, and the night-vision mode may share the demosaicing unit 54 in the image processing unit 5 and the signal processing unit implementing processing, such as white balance correction and gain correction.

Night-Vision Mode: Second Night-Vision Mode

Figure 18:
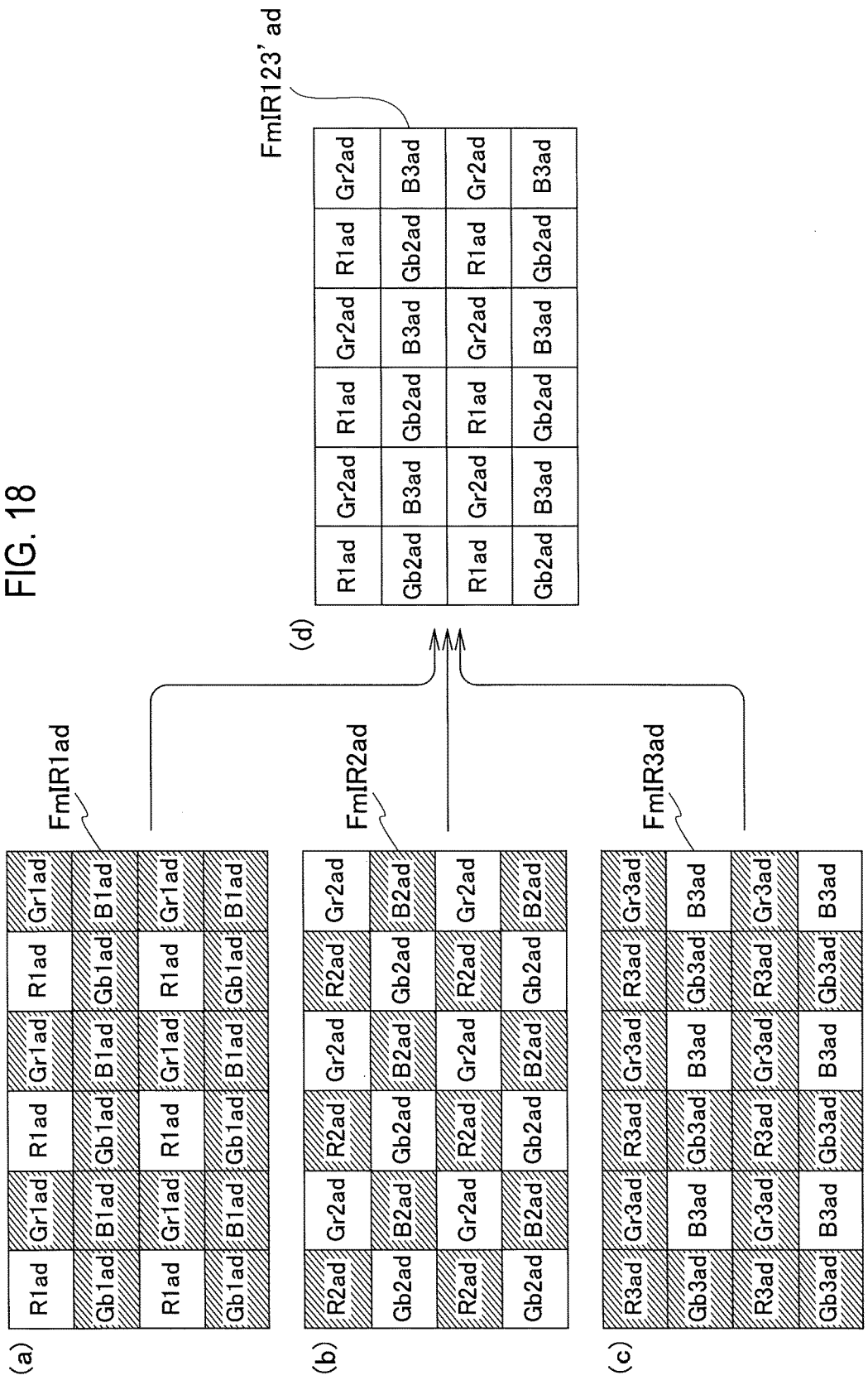
FIG. 18 is a view for describing pre-signal processing when the imaging device according to the embodiment is operating in a second night-vision mode.

Operations in the second night-vision mode are described below with reference to FIG. 18 and FIG. 19. Note that the same operations as those in the first night-vision mode are not repeated in the second night-vision mode. Here, the frames FmIR1*ad*, FmIR2*ad* and FmIR3*ad* shown in items (a) to (c) in FIG. 18 are the same as the frames FmIR1*ad*, FmIR2*ad* and FmIR3*ad* shown in items (a) to (c) in FIG. 16.

The synthesizing unit 523 selects pixel data R1*ad* for R in the frame FmIR1*ad*, pixel data Gr2*ad* and Gb2*ad* for G in the frame FmIR2*ad*, and pixel data B3*ad* for B in FmIR3*ad* and synthesizes the respective pixel data. The synthesizing unit 523 thus generates frame FmIR123'*ad* of the synthesized image signals shown in item (d) of FIG. 18.

The synthesizing unit 523 generates the frame FmIR123'*ad* in which the respective pixel data R1*ad*, Gr2*ad*, Gb2*ad* and B3*ad* are arranged so as to have the same array as the filter elements in the color filter 32.

As described with reference to FIG. 14, the pixel data R1*ad* for red in the frame FmIR123'*ad* is generated from the pixel data obtained from a wider region than the region used for generating the pixel data for red when in the intermediate mode.

The pixel data Gr2*ad* for green in the frame FmIR123'*ad* is generated from the pixel data obtained from a wider region than the region used for generating the pixel data for green when in the intermediate mode.

The pixel data B3*ad* for blue in the frame FmIR123'*ad* is generated from the pixel data obtained from a wider region than the region used for generating the pixel data for blue when in the intermediate mode.

As in the case of the second intermediate mode, the same-position pixel adding unit 522 in the second night-vision mode defines the coefficient Ka in the formula (1) as 1 and the other coefficients Kb and Kc as 0, defines the coefficient ke in the formula (2) as 1 and the other coefficients kd and kf as 0, and defines the coefficient ki in the formula (3) as 1 and the other coefficients kg and kh as 0.

Therefore, the value of the pixel data R1*ad* in the frame FmIR1*ad*, the values of the pixel data Gr2*ad* and Gb2*ad* in the frame FmIR2*ad* and the value of the pixel data B3*ad* in the frame FmIR3*ad* each remain as is.

Accordingly, the synthesizing unit 523 can generate the frame FmIR123'*ad* by selecting the pixel data R1*ad* in the frame FmIR1*ad*, the pixel data Gr2*ad* and Gb2*ad* in the frame FmIR2*ad* and pixel data B3*ad* in the frame FmIR3*ad*, in the same manner as the operations in the first night-vision mode.

The demosaicing in the demosaicing unit 54 is described below with reference to FIG. 19. Item (a) of FIG. 19 shows the frame FmIR123'*ad*. The demosaicing unit 54 computes pixel data for R for pixel positions where no pixel data for R is present by use of the surrounding pixel data R1*ad* so as to generate interpolated pixel data R1*adi* for R. The demosaicing unit 54 generates R frame FmIR123'*ad*R in which all pixels in one frame shown in item (b) of FIG. 19 are composed of the pixel data for R.

The demosaicing unit 54 computes pixel data for G for pixel positions where no pixel data for G is present by use of the surrounding pixel data Gr2*ad* and Gb2*ad* so as to generate interpolated pixel data G2*adi* for G. The demosaicing unit 54 generates G frame FmIR123'*ad*G in which all pixels in one frame shown in item (c) of FIG. 19 are composed of the pixel data for G.

The demosaicing unit 54 computes pixel data for B for pixel positions where no pixel data for B is present by use of the surrounding pixel data B3*ad* so as to generate interpolated pixel data B3*adi* for B. The demosaicing unit 54 generates B frame FmIR123'*ad*B in which all pixels in one frame shown in item (d) of FIG. 19 are composed of the pixel data for B.

The second intermediate mode and the second night-vision mode differ from each other in that the surrounding pixel adding unit 521 is inactive in the second intermediate mode, and the surrounding pixel adding unit 521 is active in the second night-vision mode.

While the pixel data for each color is generated from the pixel data obtained from the region corresponding to each color filter in the light receiving elements in the intermediate mode, the pixel data for each color is generated, in the night-vision mode, from the pixel data obtained from a wider region than the region used for generating the pixel data for each color in the intermediate mode, as the surrounding pixels are added in the night-vision mode.

Example of Mode Switch

An example of the mode switch by the mode switching unit 72 is described below with reference to FIG. 20. Item (a) of FIG. 20 is an example schematically showing a state of change in environmental brightness with the passage of time from daytime to nighttime.

As shown in item (a) of FIG. 20, the brightness decreases gradually with the passage of time from daytime to nighttime and results in almost total darkness after time t3. Item (a) of FIG. 20 shows the brightness representing the substantial amount of visible light and indicates that almost no visible light is present after time t3.

The controller 7 can determine the environmental brightness based on a brightness level of image signals (image data) input from the image processing unit 5. As shown item (b) of FIG. 20, the mode switching unit 72 selects the normal mode when the brightness is predetermined threshold Th1 (first threshold) or greater, selects the intermediate mode when the brightness is less than the threshold Th1 and predetermined threshold Th2 (second threshold) or greater, and selects the night-vision mode when the brightness is less than the threshold Th2.

The imaging device according to the present embodiment automatically switches the modes in such a manner as to select the normal mode by time t1 at which the brightness reaches the threshold Th1, select the intermediate mode in the period from time t1 to time t2 at which the brightness reaches the threshold Th2, and select the night-vision mode after time t2. In item (b) of FIG. 20, the intermediate mode may be either the first intermediate mode or the second intermediate mode, and the night-vision mode may be either the first night-vision mode or the second night-vision mode.

Although the brightness immediately before time t3 at which almost no visible light remains is defined as the threshold Th2 in item (a) of FIG. 20, the brightness at time t3 may be determined as the threshold Th2.

As shown in item (c) of FIG. 20, the mode switching unit 72 may divide the intermediate mode into two periods: a first half period toward time t1 as the first intermediate mode in which the amount of visible light is relatively high; and a second half period toward time t2 as the second intermediate mode in which the amount of visible light is relatively low. In item (c) of FIG. 20, the night-vision mode may be either the first night-vision mode or the second night-vision mode.

In the imaging device according to the present embodiment, the projection controller 71 controls the ON/OFF state of the infrared projector 9, and the mode switching unit 72 switches the respective members in the image processing unit 5 between the active state and the inactive state, so as to implement the respective modes.

As shown in FIG. 21, the normal mode is a state where the infrared projector 9 is turned OFF, the surrounding pixel adding unit 521, the same-position pixel adding unit 522 and the synthesizing unit 523 are inactive, and the demosaicing unit 54 is active.

The first intermediate mode is implemented in a state where the infrared projector 9 is turned ON, the surrounding pixel adding unit 521 is inactive, and the same-position pixel adding unit 522, the synthesizing unit 523 and the demosaicing unit 54 are active. The second intermediate mode is implemented in a state where the infrared projector 9 is turned ON, the surrounding pixel adding unit 521 and the same-position pixel adding unit 522 are inactive, and the synthesizing unit 523 and the demosaicing unit 54 are active.

The same-position pixel adding unit 522 can be easily switched between the active state and the inactive state by appropriately setting the coefficients ka to ki in the formulae (1) to (3) as described above.

The first night-vision mode is implemented in a state where the infrared projector 9 is turned ON, and the surrounding pixel adding unit 521, the same-position pixel adding unit 522, the synthesizing unit 523 and the demosaicing unit 54 are all active. The second night-vision mode is implemented in a state where the infrared projector 9 is turned ON, the same-position pixel adding unit 522 is inactive, and the surrounding pixel adding unit 521, the synthesizing unit 523 and the demosaicing unit 54 are active.

Here, the surrounding pixel adding unit 521 can be activated for the processing of adding the surrounding pixels by setting the coefficient to more than 0 (for example, 1) by which the surrounding pixel data is multiplied in the calculation formula for adding the surrounding pixel data to the pixel data of the target pixel.

The surrounding pixel adding unit 521 can be inactivated for the processing of adding the surrounding pixels by setting the coefficient to 0 by which the surrounding pixel data is multiplied in the calculation formula.

The surrounding pixel adding unit 521 thus can also be easily switched between the active state and the inactive state by setting the coefficients as appropriate.

First Modified Example of Imaging Device

The method of detecting the environmental brightness by the controller 7 is not limited to the method based on the brightness level of the image signals.

Figure 22:
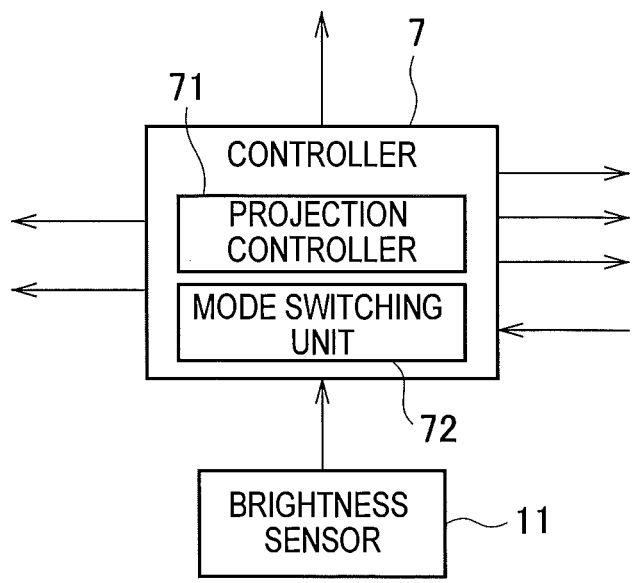
FIG. 22 is a partial block diagram showing a first modified example of the imaging device according to the embodiment.

As shown in FIG. 22, the environmental brightness may be detected by a brightness sensor 11. In FIG. 22, the environmental brightness may be determined based on both the brightness level of the image signals and the environmental brightness detected by the brightness sensor 11.

Second Modified Example of Imaging Device

The controller 7 may briefly estimate the environmental brightness based on the season (date) and the time (time zone) during a year, instead of the direct detection of the environmental brightness, so that the mode switching unit 72 switches the modes.

Figure 23:
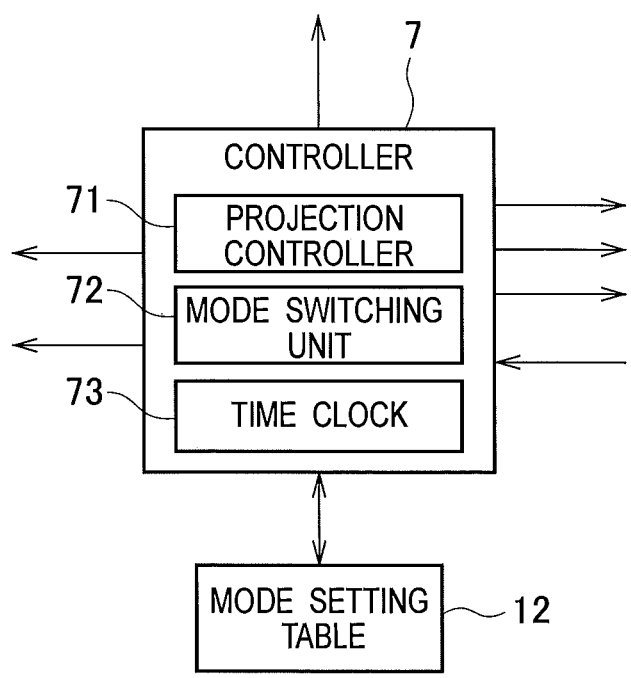
FIG. 23 is a partial block diagram showing a second modified example of the imaging device according to the embodiment.

As shown in FIG. 23, the normal mode, the intermediate mode and the night-vision mode are set in a mode setting table 12 depending on the combination of the date and time. A time clock 73 in the controller 7 manages the date and the time. The controller 7 refers to the date and the time indicated on the time clock 73 to read out the mode set in the mode setting table 12.

The projection controller 71 and the mode switching unit 72 control the imaging device so that the mode read from the mode setting table 12 is selected.

Third Modified Example of Imaging Device

Figure 24:
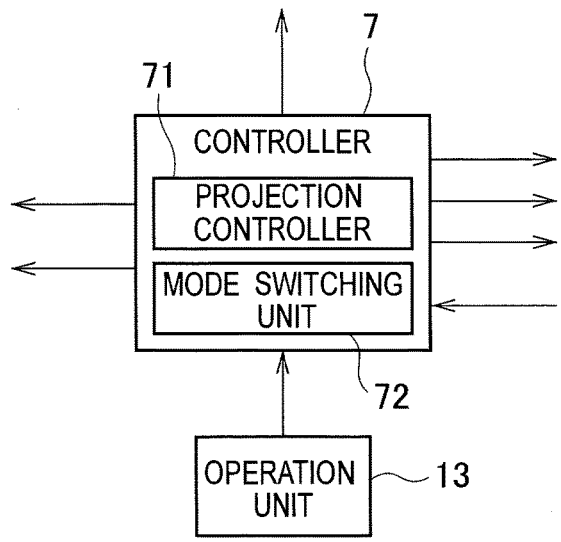
FIG. 24 is a partial block diagram showing a third modified example of the imaging device according to the embodiment.

As shown in FIG. 24, a user may control the imaging device with an operation unit 13 by manually selecting one of the modes so as to set the projection controller 71 and the mode switching unit 72 to the selected mode. The operation unit 13 may be operated using operation buttons provided on the casing of the imaging device or by a remote controller.

Image Signal Processing Method

The image signal processing method executed by the imaging device shown in FIG. 1 is again described in detail below with reference to FIG. 25.

Figure 25:
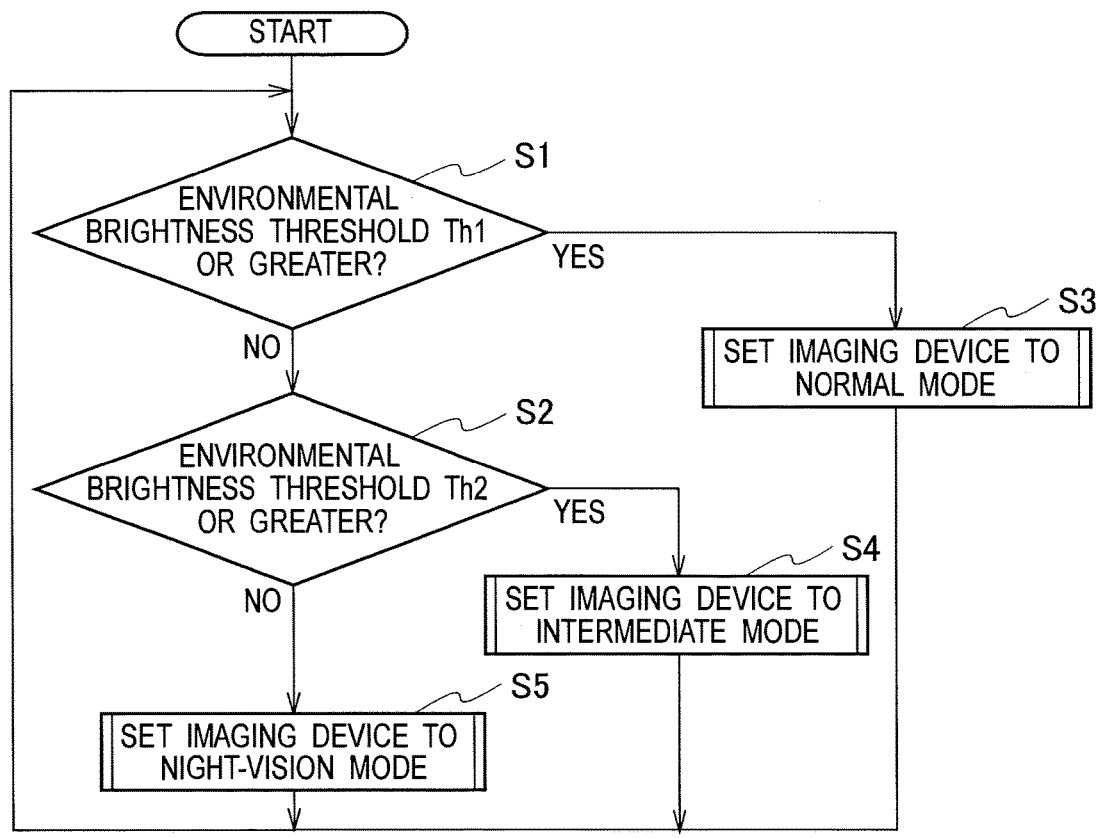
FIG. 25 is a flowchart showing an image signal processing method implemented by the imaging device according to the embodiment.

In FIG. 25, once the imaging device starts operating, the controller 7 determines whether the environmental brightness is the threshold Th1 or greater in step S1. When the environmental brightness is the threshold Th1 or greater (YES), the controller 7 executes the processing in the normal mode in step S3. When the environmental brightness is not the threshold Th1 or greater (NO), the controller 7 determines whether the environmental brightness is threshold Th2 or greater in step S2.

When the environmental brightness is the threshold Th2 or greater (YES), the controller 7 executes the processing in the intermediate mode in step S4. When the environmental brightness is not the threshold Th2 or greater (NO), the controller 7 executes the processing in the night-vision mode in step S5.

The controller 7 returns to the processing in step S1 after executing the processing from steps S3 to S5 and repeats the respective following steps.

Figure 26:
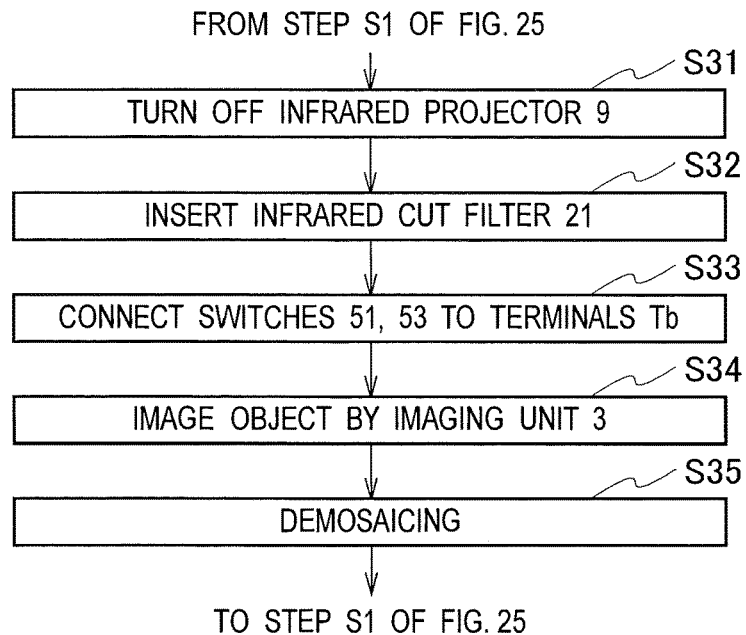
FIG. 26 is a flowchart showing a specific processing step in the normal mode shown in step S3 of FIG. 25.

FIG. 26 shows the specific processing in the normal mode in step S3. In FIG. 26, the controller 7 (the projection controller 71) turns off the infrared projector 9 in step S31. The controller 7 inserts the infrared cut filter 21 in step S32. The controller 7 (the mode switching unit 72) connects the switches 51 and 53 to the respective terminals Tb in step S33. The execution order from steps S31 to S33 is optional. The steps S31 to S33 can be executed simultaneously.

The controller 7 directs the imaging unit 3 to image an object in step S34. The controller 7 controls the image processing unit 5 in step S35 so that the demosaicing unit 54 subjects, to demosaicing, a frame composing image signals generated when the imaging unit 3 images the object.

Figure 27:
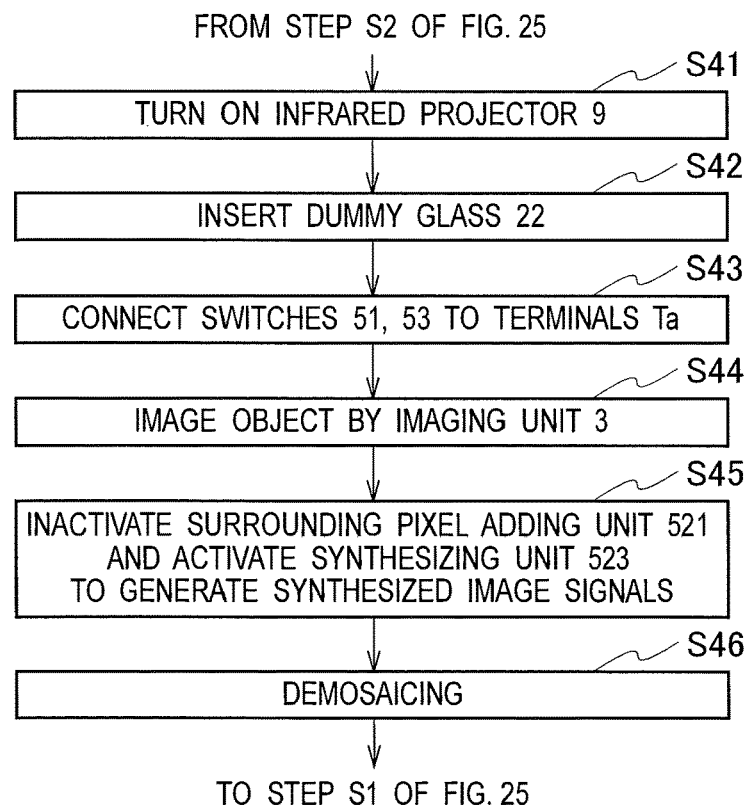
FIG. 27 is a flowchart showing a specific processing step in the intermediate mode shown in step S4 of FIG. 25.

FIG. 27 shows the specific processing in the intermediate mode in step S4. In FIG. 27, the controller 7 (the projection controller 71) turns on the infrared projector 9 in step S41 so that the projecting portions 91 to 93 project infrared light with the respective wavelengths IR1 to IR3 in a time division manner.

The controller 7 inserts the dummy glass 22 in step S42. The controller 7 (the mode switching unit 72) connects the switches 51 and 53 to the respective terminals Ta in step S43. The execution order from steps S41 to S43 is optional. The steps S41 to S43 may be executed simultaneously.

The controller 7 directs the imaging unit 3 to image an object in step S44. The imaging unit 3 images the object in a state where the infrared light with the wavelength IR1 assigned to R, the infrared light with the wavelength IR2 assigned to G and the infrared light with the wavelength IR3 assigned to B, are each projected.

The controller 7 (the mode switching unit 72) controls the pre-signal processing unit 52 in step S45 so as to inactivate the surrounding pixel adding unit 521 and activate the synthesizing unit 523 to generate synthesized image signals.

The respective frames composing the image signals generated when the imaging unit 3 images the object in the state where the infrared light with the respective wavelengths IR1, IR2 and IR3 is projected, are defined as a first frame, a second frame, and a third frame.

The synthesizing unit 523 arranges the pixel data for the three primary colors based on the pixel data for R in the first frame, the pixel data for G in the second frame and the pixel data for B in the third frame so as to have the same array as the filter elements in the color filter 32. The synthesizing unit 523 thus generates the synthesized image signals in a manner such that the image signals in the first to third frames are synthesized in one frame.

The controller 7 controls the image processing unit 5 in step S46 so that the demosaicing unit 54 subjects the frame composing the synthesized image signals to demosaicing.

The demosaicing unit 54 executes, based on the frame of the synthesized image signals, demosaicing for generating an R frame, a G frame and a B frame so as to sequentially generate the frames of the three primary colors subjected to demosaicing.

The demosaicing unit 54 can generate the R frame by interpolating the pixel data for R in the pixel positions where no pixel data for R is present. The demosaicing unit 54 can generate the G frame by interpolating the pixel data for G in the pixel positions where no pixel data for G is present. The demosaicing unit 54 can generate the B frame by interpolating the pixel data for B in the pixel positions where no pixel data for B is present.

When executing the operations in the first intermediate mode, the controller 7 activates the same-position pixel adding unit 522 in step S45. When executing the operations in the second intermediate mode, the controller 7 inactivates the same-position pixel adding unit 522 in step S45.

Figure 28:
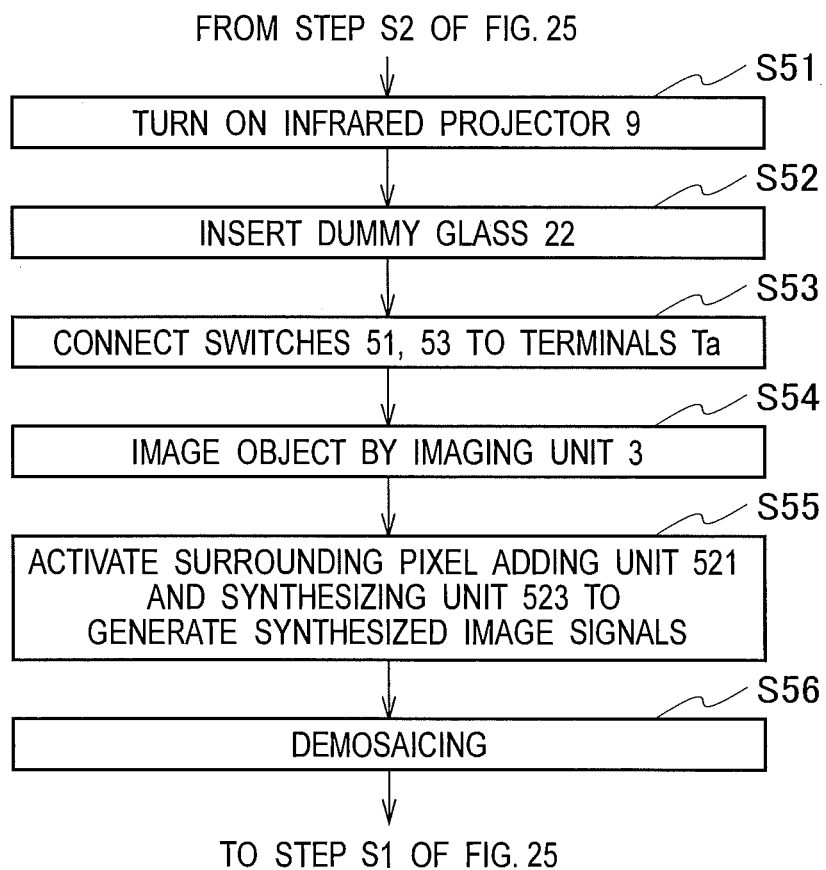
FIG. 28 is a flowchart showing a specific processing step in the night-vision mode shown in step S5 of FIG. 25.

FIG. 28 shows the specific processing in the night-vision mode in step S5. In FIG. 28, the controller 7 (the projection controller 71) turns on the infrared projector 9 in step S51 so that the projecting portions 91 to 93 project infrared light with the respective wavelengths IR1 to IR3 in a time division manner.

The controller 7 inserts the dummy glass 22 in step S52. The controller 7 (the mode switching unit 72) connects the switches 51 and 53 to the respective terminals Ta in step S53. The execution order from steps S51 to S53 is optional. The steps S51 to S53 may be executed simultaneously.

The controller 7 directs the imaging unit 3 to image an object in step S54. The controller 7 (the mode switching unit 72) controls the pre-signal processing unit 52 in step S55 so as to activate the surrounding pixel adding unit 521 and the synthesizing unit 523 to generate synthesized image signals.

The controller 7 controls the image processing unit 5 in step S56 so that the demosaicing unit 54 subjects the frame composing the synthesized image signals to demosaicing.

When executing the operations in the first night-vision mode, the controller 7 activates the same-position pixel adding unit 522 in step S55. When executing the operations in the second night-vision mode, the controller 7 inactivates the same-position pixel adding unit 522 in step S55.

Image Signal Processing Program

In FIG. 1, the controller 7 or the integrated portion of the image processing unit 5 and the controller 7 may be composed of a computer (microcomputer), and an image signal processing program (computer program) may be executed by the computer so as to implement the same operations as those in the imaging device described above. The integrated portion may further include the image output unit 6 so as to be composed of the computer.

An example of a procedure of the processing executed by the computer when the processing in the intermediate mode executed in step S4 shown in FIG. 25 is included in the image signal processing program, is described below with reference to FIG. 29. FIG. 29 shows the processing executed by the computer directed by the image signal processing program regarding the mode switch.

In FIG. 29, the image signal processing program directs the computer to control the infrared projector 9 in step S401 to project infrared light with the wavelengths IR1, IR2 and IR3 assigned to R, G and B, respectively.

The step in step S401 may be executed by an external unit outside of the image signal processing program. In FIG. 29, the step of inserting the dummy glass 22 is omitted. The step of inserting the dummy glass 22 may be executed by the external unit outside of the image signal processing program.

The image signal processing program directs the computer in step S402 to obtain the pixel data composing the first frame of the image signals generated when the imaging unit 3 images the object in the state where the infrared light with the wavelength IR1 is projected.

The image signal processing program directs the computer in step S403 to obtain the pixel data composing the second frame of the image signals generated when the imaging unit 3 images the object in the state where the infrared light with the wavelength IR2 is projected.

The image signal processing program directs the computer in step S404 to obtain the pixel data composing the third frame of the image signals generated when the imaging unit 3 images the object in the state where the infrared light with the wavelength IR3 is projected. The execution order from steps S402 to 404 is optional.

The image signal processing program directs the computer in step S405 to arrange the respective pixel data for R, G and B in such a manner as to have the same array as the filter elements in the color filter 32 so as to generate the synthesized image signals synthesized in one frame.

In the intermediate mode, the image signal processing program does not direct the computer to execute the processing of adding the surrounding pixels in step S405.

The image signal processing program directs the computer in step S406 to subject the frame of the synthesized image signals to demosaicing so as to generate the frames of R, G and B.

Although not illustrated in the drawing, the image signal processing program may direct the computer to execute the processing of adding the surrounding pixels in step S405 in FIG. 25 when the processing in the night-vision mode executed in step S5 shown in FIG. 25 is included in the image signal processing program.

The image signal processing program may be a computer program recorded in a readable storage medium. The image signal processing program may be provided in a state of being stored in the storage medium, or may be provided via a network such as Internet in a manner such that the image signal processing program is downloaded to the computer. The storage medium readable on the computer may be an arbitrary non-transitory storage medium such as CD-ROM and DVD-ROM.

The imaging device configured as shown in FIG. 1 may include two or more sets of the respective members as necessary so as to execute the intermediate mode and the night-vision mode simultaneously. In such a case, the image output unit 6 may output both the image signals generated in the intermediate mode and the image signals generated in the night-vision mode.

The mode switching unit 72 may switch between a state where the image output unit 6 outputs the image signals generated in the intermediate mode and a state where the image output unit 6 outputs the image signals generated in the night-vision mode. In such a case, the mode switching unit 72 may switch the states depending on the environmental brightness or the time, as described above. In addition, the image processing unit 5 (image processing device) may be provided separately from the other members.

Further, the normal mode may be switched directly to the night-vision mode, or the night-vision mode may be switched directly to the normal mode, bypassing the intermediate mode.

When the intermediate mode is not present, either the normal mode or the night-vision mode may be selected and used even under the condition that the intermediate mode is appropriate. In such a case, although fine color image signals are not obtained as in the case of using the intermediate mode, images can be captured.

Even the imaging device only equipped with the normal mode and the night-vision mode can image objects in variable conditions of environmental brightness, such as a case where a surveillance camera captures objects throughout the day.

Further, the normal mode may be switched to the intermediate mode, and the intermediate mode may be switched to the normal mode, instead of using the night-vision mode. If the night-vision mode is constantly inactive, the night-vision mode may be eliminated from the imaging device.

The night-vision mode is not necessarily used in an area where, for example, electric lighting is equipped. The imaging device only equipped with the normal mode and the intermediate mode may be used in the case where the night-vision mode is not necessarily used.

When the night-vision mode is not present, the intermediate mode may be used even under the condition that the night-vision mode is appropriate. In such a case, although fine color image signals are not obtained as in the case of using the night-vision mode, images can be captured.

Even the imaging device only equipped with the normal mode and the intermediate mode can image objects in variable conditions of environmental brightness, as in the case described above.

The mode switching method for switching images between the normal mode and the infrared projecting mode, without image distortion, will be described in detail below.

First Example of the Mode Switching Method

FIG. 30A and FIG. 30B show a first example of the mode switching method. FIG. 30A and FIG. 30B show the operations of the respective components of the imaging device in the case where the image output unit 6 outputs image signals in the interlaced format through the NTSC encoder 61.

FIG. 30A and FIG. 30B show a sequence in the case where the controller 7 switches the imaging device from the infrared projecting mode to the normal mode at time t1, and switches the imaging device from the normal mode to the infrared projecting mode at time 2. The infrared projecting mode may be either the intermediate mode or the night-vision mode.

FIG. 30A and FIG. 30B each show the sequence divided into two parts. The two parts of the sequence shown in FIG. 30A and FIG. 30B partly overlap each other.

Item (a) of FIG. 30A and FIG. 30B shows a projecting state of infrared light projected by the infrared projector 9, and item (b) of FIG. 30A and FIG. 30B shows exposure of the imaging unit 3. Each exposure of the imaging unit 3, shown in item (b) of FIG. 30A and FIG. 30B, denotes the maximum exposure time tExmax, as described above, with reference to item (a) of FIG. 6. The actual exposure time varies depending on the pressing speed of the shutter. However, in the infrared projecting mode, the maximum exposure time tExmax is apt to be the actual exposure time.

Item (c) of FIG. 30A and FIG. 30B shows frames generated from imaging signals read out from the imaging unit 3, based on each exposure shown in item (b) of FIG. 30A and FIG. 30B. As shown in FIG. 30A, frames F1R, F1G, and F1B are obtained based on exposures Ex1R, Ex1G, and Ex1B, such that the frame F1R corresponds to the exposure Ex1R, the frame F1G to the exposure Ex1G, and the frame F1B to the exposure Ex1B. The frames F1R, F1G, and F1B correspond to frames F1IR1, F1IR2, and F1IR3 respectively, shown in item (c) of FIG. 9.

The following frames F2R, F2G, and F2B are obtained based on exposures Ex2R, Ex2G, and Ex2B, such that the frame F2R corresponds to the exposure Ex2R, the frame F2G to the exposure Ex2G, and the frame F2B to the exposure Ex2B. The frames F2R, F2G, and F2B correspond to the frames F2IR1, F2IR2, and F2IR3 respectively, as shown in item (c) of FIG. 9. The maximum exposure time tExmax of the respective exposures Ex1R to Ex2B is 1/90 seconds.

The imaging signals are output from the imaging unit 3 in the progressive format at 90 frames per second during the period of the infrared projecting mode, before time t1. The progressive format at 90 frames per second is hereinafter referred to as 90P. The imaging device generates image signals in the interlaced format at 60 fields per second, based on the imaging signals at 90P, in the manner as described below. The interlaced format at 60 fields per second is hereinafter referred to as 60$i$.

The projection controller 71 turns off the infrared projector 9 to stop projecting infrared light at time t1. The controller 7 controls the imaging device to operate in the normal mode after time t1.

In the case of 30 frames per second in the period of the normal mode, the image signals are generated in the interlaced format at 60 fields per second. In the normal mode, the controller 7 controls the imaging unit 3 to output the imaging signals at 60P, so that the image output unit 6 finally generates and outputs the image signals at 60$i$.

In particular, the imaging unit 3 sets the maximum exposure time tExmax to 1/60 seconds, and alternately repeats exposure for an odd field and exposure for an even field. In FIG. 30A and FIG. 30B, the index "o" indicates the exposure for the odd field, and the index "e" indicates the exposure for the even field.

As shown in item (c) of FIG. 30A, the frame F2B, in which the maximum exposure time tExmax is 1/90 seconds, is generated in the first exposure after time t1. The first exposure, after time t1, is set to odd field exposure Ex3$o$ in which the maximum exposure time tExmax is set to 1/90 seconds instead of 1/60 seconds.

In the first example as shown in FIG. 30A, the imaging unit 3 operates to output the imaging signals at 90P by time t11 at which the exposure Ex3$o$ ends. The imaging unit 3 operates to output the imaging signals at 60P after time t11.

Since even field exposure Ex3$e$ that is the first exposure after time t11 is paired with the odd field exposure Ex3$o$, the maximum exposure time tExmax in the even field exposure Ex3$e$ is preferably set to 1/90 seconds instead of 1/60 seconds, which is the same as the odd field exposure Ex3$o$.

The controller 7 controls the imaging unit 3 to release the stored electric charges by supplying the extracting pulse Ps1, as described above with reference to FIG. 6, only for the period of 1/180 seconds from the beginning of the maximum exposure time tExmax of 1/60 seconds. A time interval of 1/180 seconds is therefore provided between the exposure Ex3$o$ and the exposure Ex3$e$, so that the actual maximum exposure time of the exposure Ex3$e$ is 1/90 seconds.

The electric charges stored by the respective exposures Ex3$o$ and Exe3, in which the maximum exposure time is 1/90 seconds, are read out for the period of 1/60 seconds so as to obtain frame F3$o$ corresponding to the exposure Ex3$o$, and frame F3$e$ to the exposure Ex3$e$.

After the exposure Ex3$e$, the electric charges stored by each of the following exposures Ex4$o$, Ex4$e$, Ex5$o$, and Ex5$e$, in which the maximum exposure time is 1/60 seconds, are read out for the period of 1/60 seconds so as to obtain frames F4$o$, F4$e$, F5$o$, and F5$e$.

As shown in FIG. 30B, the projection controller 71 turns on the infrared projector 9 again to project infrared light at time t2. The controller 7 controls the imaging device to operate in the infrared projecting mode after time t2.

The frame F5$e$ is generated based on the exposure Ex5$e$ for the period of 1/60 seconds through time t2. In the infrared projecting mode after time t2, the maximum exposure time tExmax is required to be set to 1/90 seconds. The controller 7 therefore controls the imaging unit 3 to release the stored electric charges by supplying the extracting pulse Ps1, only for the period of 1/180 seconds from the beginning of the maximum exposure time tExmax of 1/60 seconds in the exposure Ex6R, after the exposure Ex5$e$.

A time interval of 1/180 seconds is therefore provided between the exposure Ex5$e$ and the exposure Ex6R, so that the actual maximum exposure time of the exposure Ex6R is 1/90 seconds.

The following frames F6R, F6G, and F6B are obtained based on exposures Ex6R, Ex6G, and Ex6B, such that the frame F6R corresponds to the exposure Ex6R, the frame F6G to the exposure Ex6G, and the frame F6B to the exposure Ex6B. Since the frames F6R, F6G, and F6B compose one frame, the exposure times of the exposures Ex6R, Ex6G, and Ex6B are required to be the same. The maximum exposure time of the exposure Ex6R is set to 1/90 seconds, so that the exposures Ex6R, Ex6G, and Ex6B have the same exposure time.

The following frames of F7R, F7G, and F7B are obtained based on exposures Ex7R, Ex7G, and Ex7B, such that the frame F7R corresponds to the exposure Ex7R, the frame F7G to the exposure Ex7G, and the frame F7B to the exposure Ex7B. The same operations are repeated after exposure Ex8R.

In the first example as shown in FIG. 30B, the imaging unit 3 operates to output the imaging signals at 60P by time t21 at which the exposure Ex6R ends, and further operates to output the imaging signals at 90P after time t21.

As described above, in the first example shown in FIG. 30A and FIG. 30B, the first exposure after time t1, at which the infrared projecting mode is switched to the normal mode, is the exposure Ex3o in which the maximum exposure time tExmax is set to 1/90 seconds instead of 1/60 seconds.

The electric charges are released for the period of 1/180 seconds from the beginning of the maximum exposure time tExmax of 1/60 seconds through time t2, at which the normal mode is switched to the infrared projecting mode, so that the maximum exposure time tExmax of the first exposure after time t2 results in 1/90 seconds.

Accordingly, as shown in item (c) of FIG. 30A and FIG. 30B, the frames generated by the imaging signals read out from the imaging unit 3 are continuously generated when the infrared projecting mode is switched to the normal mode, and when the normal mode is switched to the infrared projecting mode.

Item (d) of FIG. 30A and FIG. 30B shows frames of image data output from the A/D converter 4 and written to the frame buffer 50, and item (e) shows frames read out from the frame buffer 50. The respective sections shown in items (d) and (e) of FIG. 30A and FIG. 30B are designated by reference numerals 50a to 50f that are memories written to or read out from the frame buffer 50.

The frames of the image data output from the A/D converter are also referred to as the frames F1R, F1G, F1B, etc. . . . of the imaging signals, shown in item (c) of FIG. 30A and FIG. 30B. The frames F1R, F1G, and F1B are written to the memories 50a, 50b, and 50c, respectively.

When the writing of the frame F1B onto the memory 50c is finished, the frames F1R, F1G, and F1B are simultaneously read out from the memories 50a, 50b, and 50c for the period of 1/60 seconds. The frames F1R, F1G, and F1B are further read out from the memories 50a, 50b, and 50c simultaneously for the following period of 1/60 seconds. The frames F1R, F1G, and F1B are therefore read out from the memories 50a, 50b, and 50c twice during the sequential two periods of 1/60 seconds.

The frames F2R, F2G, and F2B are written to the memories 50d, 50e, and 50f, respectively, for the period corresponding to the period for which the frames F1R, F1G, and F1B are read out. When the writing of the frame F2B onto the memory 50f is finished, the frames F2R, F2G, and F2B are also read out from the memories 50d, 50e, and 50f twice during the sequential two periods of 1/60 seconds.

A set of the frames is sequentially read out twice in the infrared projecting mode, so as to generate an odd field by the former set of the frames, and to generate an even field by the latter set of the frames.

The frames F3o and F3e are written to the memories 50a and 50b. When the writing of the frame F3e onto the memory 50b is finished, the frames F3o and F3e are read out from the memories 50a and 50b. The frames F4o and F4e are written to the memories 50d and 50e. When the writing of the frame F4e onto the memory 50e is finished, the frames F4o and F4e are read out from the memories 50d and 50e.

The frames F5o and F5e are written to the memories 50a and 50b. When the writing of the frame F5e onto the memory 50b is finished, the frames F5o and F5e are read out from the memories 50a and 50b.

The frames F6R, F6G, and F6B are written to the memories 50d, 50e, and 50f, respectively. When the writing of the frame F6B onto the memory 50f is finished, the frames F6R, F6G, and F6B are read out from the memories 50d, 50e, and 50f twice during the sequential two periods of 1/60 seconds.

The frames F7R, F7G, and F7B are written to the memories 50a, 50b, and 50c, respectively. Although not shown in FIG. 30B, when the writing of the frame F7B onto the memory 50c is finished, the frames F7R, F7G, and F7B are read out from the memories 50a, 50b, and 50c twice during the sequential two periods of 1/60 seconds. The same operations are repeatedly performed on the following frames.

Item (f) of FIG. 30A and FIG. 30B shows pre-signal processing in the pre-signal processing unit 52 described above. The pre-signal processing is designated by P52. The frames F1R, F1G, and F1B read out from the memories 50a, 50b, and 50c are collectively designated by F1RGB. For example, P52 (F1RGB) denotes that the frame F1RGB is subjected to the pre-signal processing P52.

As shown in item (f) of FIG. 30A and FIG. 30B, the respective two sets of the frames F0RGB, F1RGB, F2RGB, F6RGB, etc. . . . , during the sequential two periods of 1/60, are subjected to the pre-signal processing P52.

Item (g) of FIG. 30A and FIG. 30B shows pre-signal processing in the demosaicing unit 54 described above. The demosaicing is designated by P54. For example, P54 (F1RGB) denotes that the frame F1RGB is subjected to the demosaicing P54.

As shown in item (g) of FIG. 30A and FIG. 30B, the frames F0RGB, F1RGB, F2RGB, F6RGB, etc. . . . , subjected to the pre-signal processing P52, are further subjected to the demosaicing P54. The frames F3o, F3e, F4o, F4e, F5o, and F5e not subjected to the pre-signal processing P52 are subjected to the demosaicing P54.

Item (h) of FIG. 30A and FIG. 30B shows image signals in the interlaced format obtained such that the respective frames shown in item (g) are subjected to progressive-interlaced conversion (PI conversion) by the NTSC encoder 61. In item (h) of FIG. 30A and FIG. 30B, the index "o" indicates an image signal of an odd field, and the index "e" indicates an image signal of an even field.

In the infrared projecting mode, as shown in item (h) of FIG. 30A and FIG. 30B, image signals F0io, F0ie, F1io, F1ie, F2io, and F2ie in the interlaced format are sequentially generated and output based on each image data of the frames F0RGB, F1RGB, and F2RGB, subjected to the demosaicing P54. The index "i" indicates that each signal is an image signal in the interlaced format, obtained by thinning out the horizontal lines by the PI conversion.

As shown in item (h) of FIG. 30A and FIG. 30B, when the mode is switched to the normal mode, image signals F3io, F3ie, F4io, F4ie, F5io, and F5ie in the interlaced format are sequentially generated and output based on each image data of the frames F3o, F3e, F4o, F4e, F5o, and F5e subjected to the demosaicing P54.

As shown in item (h) of FIG. 30B, when the mode is switched to the infrared projecting mode, image signals F6io, F6ie, etc. . . . in the interlaced format are sequentially generated and output based on each image data of the frames F6RGB, etc. . . . , subjected to the demosaicing P54.

In the first example, as shown in item (h) of FIG. 30A and FIG. 30B, the respective frames (the respective fields) are sequentially output regardless of whether the image signals at 60i are switched from the infrared projecting mode to the normal mode, or switched from the normal mode to the infrared projecting mode.

According to the first example, the images can therefore be switched between the respective modes without image distortion.

In the first example shown in FIG. 30A and FIG. 30B, the boundaries of the frames generated by the exposures of the imaging unit 3 shown in item (b) correspond to the boundaries of the frames (fields) of the output image signals shown in item (g) during the normal mode. Namely, the frames generated by the exposures of the imaging unit 3 are synchronized with the frames of the output image signals. Accordingly, noise caused in the output image signals is minimized.

Second Example of the Mode Switching Method

FIG. 31A and FIG. 31B show a second example of the mode switching method. FIG. 31A and FIG. 31B also show the operations of the respective components of the imaging device in the case where the image output unit 6 outputs image signals in the interlaced format through the NTSC encoder 61.

The second example shown in FIG. 31A and FIG. 31B is described below mainly in points different from those of the first example, shown in FIG. 30A and FIG. 30B. FIG. 31A and FIG. 31B each show the sequence divided into two parts. The two parts of the sequence shown in FIG. 31A and FIG. 31B partly overlap each other.

In the second example shown in item (b) of FIG. 31A and FIG. 31B, exposure of the imaging unit 3 are all configured such that the maximum exposure time tExmax is set to $\frac{1}{60}$ seconds during the normal mode from time t1 to time t2. As shown in item (c) of FIG. 31A and FIG. 31B, the controller 7 controls the imaging unit 3 to read out the imaging signals for $\frac{1}{60}$ seconds, so as to generate the frames F3o, F3e, F4o, F4e, F5o, and F5e based on the exposures Ex3o, Ex3e, Ex4o, Ex4e, Ex5o, and Ex5e during the normal mode.

The readout of the frame F3o corresponding to the exposure Ex3o starts at the point when the exposure Ex3o ends. Namely, the frame F3o starts after the elapse of $\frac{1}{180}$ seconds from the point when the frame F2B ends. A time interval of $\frac{1}{180}$ seconds is therefore provided between the frame F2B and the frame F3o. Similarly, a time interval of $\frac{1}{180}$ seconds is provided between the following respective frames F3o, F3e, F4o, F4e, F5o, and F5e adjacent to each other.

Items (d) to (h) of FIG. 31A and FIG. 31B are similar to items (d) to (h) of FIG. 30A and FIG. 30B. In items (d) and (e) of FIG. 31A and FIG. 31B, however, the respective frames F3o to F5e written to the frame buffer 50, for the period of $\frac{1}{90}$ seconds, are read out from the frame buffer 50 for the period of $\frac{1}{60}$ seconds.

In the second example, as shown in item (h) of FIG. 31A and FIG. 31B, the respective frames (the respective fields) are sequentially output regardless of whether the image signals at 60i are switched from the infrared projecting mode to the normal mode, or switched from the normal mode to the infrared projecting mode.

According to the second example, the images can therefore be switched between the respective modes without image distortion.

In the second example shown in FIG. 31A and FIG. 31B, the frames generated by the exposures of the imaging unit 3 shown in item (b), are not synchronized with the frames of the output image signals shown in item (g) during the normal mode. In the second example shown in FIG. 31A and FIG. 31B, however, the period of each pair of the frames for the odd field and the frames for the even field of the exposures of the imaging unit 3, is uniformly set to $\frac{1}{30}$ seconds.

Third Example of the Mode Switching Method

Figure 32B:
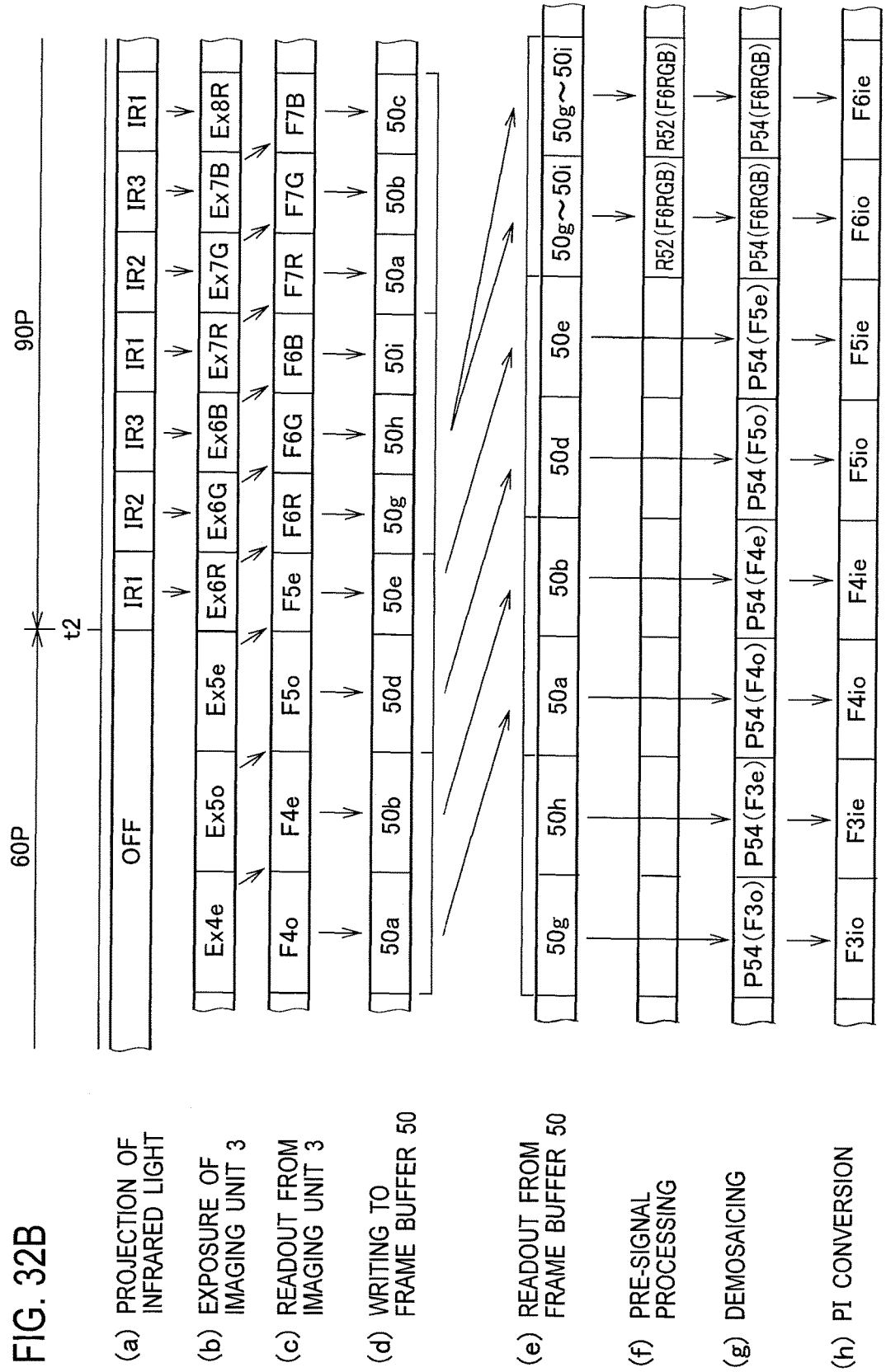
FIG. 32B is a view showing a sequence of a third example of a mode switching method of switching between the normal mode and the infrared projecting mode.

FIG. 32A and FIG. 32B show a third example of the mode switching method. FIG. 32A and FIG. 32B also show the operations of the respective components of the imaging device in the case where the image output unit 6 outputs image signals in the interlaced format through the NTSC encoder 61.

The third example shown in FIG. 32A and FIG. 32B is described below mainly in points different from those of the first example shown in FIG. 30A and FIG. 30B. FIG. 32A and FIG. 32B each show the sequence divided into two parts. The two parts of the sequence shown in FIG. 32A and FIG. 32B partly overlap each other.

For the implementation of the third example, the frame buffer 50 includes the memories 50a to 50i, with a capacity corresponding to nine frames, as shown in FIG. 1. Although the memories having a capacity of at least seven frames are sufficient to implement the third example, FIG. 1 shows the case of including the memories 50a to 50i having a capacity of nine frames, in order to facilitate writing and readout of the memories.

In the third example shown in item (b) of FIG. 32A and FIG. 32B, exposure of the imaging unit 3 are all configured such that the maximum exposure time tExmax is set to $\frac{1}{60}$ seconds during the normal mode from time t1 to time t2.

As shown in item (c) of FIG. 32A and FIG. 32B, the controller 7 controls the imaging unit 3 to readout the stored electric charges for $\frac{1}{60}$ seconds so as to generate the frames F3o, F3e, F4o, F4e, and F5o based on the exposures Ex3o, Ex3e, Ex4o, Ex4e, and Ex5o during the normal mode.

As shown in item (c) of FIG. 32A, the controller 7 controls the imaging unit 3 to read out the stored electric charges for $\frac{1}{60}$ seconds only in the last exposure Ex2B in the infrared projecting mode so as to generate the frame F2B.

As shown in item (c) of FIG. 32B, the controller 7 controls the imaging unit 3 to read out the stored electric charges for $\frac{1}{90}$ seconds only in the last exposure Ex5e in the normal mode, so as to generate the frame F5e. This equalizes the maximum exposure time of the first exposure Ex6R after time t2 with the period of the frame F5e.

As shown in item (d) of FIG. 32A, the frames F1R, F1G, and F1B are written to the memories 50a, 50b, and 50c, respectively. As shown in item (e) of FIG. 32A, when the writing of the frame F1B onto the memory 50c is finished, the frames F1R, F1G, and F1B are read out from the memories 50a, 50b, and 50c twice during the sequential two periods of $\frac{1}{60}$ seconds.

The frames F2R, F2G, and F2B are written to the memories 50d, 50e, and 50f, respectively. When the writing of the frame F2B onto the memory 50f is finished, the frames F2R, F2G, and F2B are also read out from the memories 50d, 50e, and 50f twice during the sequential two periods of $\frac{1}{60}$ seconds.

It is apparent from items (d) and (e) of FIG. 32A that the timing of writing the frames F2R, F2G, and F2B onto the memories 50d, 50e, and 50f does not coincide with the timing of reading out the frames F1R, F1G, and F1B from the memories 50a, 50b, and 50c in the third example. This is because the frame F2B is generated for 1/60 seconds.

The frame buffer 50 including the memories 50a to 50f with a capacity corresponding to six frames shown in FIG. 1, thus cannot implement the third example. For this reason, the frame buffer 50 in the third example includes the memories 50a to 50i, with a capacity corresponding to nine frames, as shown in FIG. 1.

As shown in items (d) and (e) of FIG. 32A and FIG. 32B, the frames F3o and F3e are written to the memories 50g and 50h. When the writing of the frame F3e onto the memory 50h is finished, the frames F3o and F3e are read out from the memories 50g and 50h. The frames F4o and F4e are written to the memories 50a and 50b. When the writing of the frame F4e onto the memory 50b is finished, the frames F4o and F4e are read out from the memories 50a and 50b.

The frames F5o and F5e are written to the memories 50d and 50e. When the writing of the frame F5e onto the memory 50e is finished, the frames F5o and F5e are read out from the memories 50d and 50e.

The frames F6R, F6G, and F6B are written to the memories 50g, 50h, and 50i, respectively. When the writing of the frame F6B onto the memory 50i is finished, the frames F6R, F6G, and F6B are read out from the memories 50g, 50h, and 50i twice during the sequential two periods of 1/60 seconds.

The frames F7R, F7G, and F7B are written to the memories 50a, 50b, and 50c, respectively. Although not shown in FIG. 32B, when the writing of the frame F7B onto the memory 50c is finished, the frames F7R, F7G, and F7B are read out from the memories 50a, 50b, and 50c twice during the sequential two periods of 1/60 seconds. The same operations are repeatedly performed on the following frames.

Items (f) to (h) of FIG. 32A and FIG. 32B are similar to items (f) to (h) of FIG. 30A and FIG. 30B.

In the third example, as shown in item (h) of FIG. 32A and FIG. 32B, the respective frames (the respective fields) are sequentially output regardless of whether the image signals at 60i are switched from the infrared projecting mode to the normal mode, or switched from the normal mode to the infrared projecting mode.

According to the third example, the images can therefore be switched between the respective modes without image distortion.

In the third example, shown in FIG. 32A and FIG. 32B, the exposures of the imaging unit 3 shown in item (b) are synchronized with the output image signals shown in item (g) during the normal mode. The synchronization of the exposures of the imaging unit 3 with the output image signals minimizes noise caused in the output image signals.

As described above, the frame buffer 50 is required to have a greater memory capacity than in the first example for the implementation of the third example. In view of this, the first example has the advantage of requiring the frame buffer 50 to have a smaller memory capacity.

The third example, however, can be implemented with the frame buffer 50 having memories with a capacity corresponding to seven frames, depending on the way to control writing and readout of the memories. The memory capacity therefore is not a critical consideration for the frame buffer 50 in the third example.

Summary of the Mode Switching Methods in Imaging Device

The mode switching methods according to the first to third examples for the imaging device of the present embodiment are summarized below.

The imaging unit 3 images an object. The image processing unit 5 generates first image signals based on imaging signals output from the imaging unit 3. The first image signals are signals obtained such that image data output from the A/D converter 4 is subjected to both the pre-signal processing P52 and the demosaicing P54, or subjected only to the demosaicing P54.

The image output unit 6 (the NTSC encoder 61) generates and outputs second image signals in a predetermined signal format, based on the first image signals. The predetermined signal format is an interlaced format, or may be a progressive format. The second image signals are signals converted into a final signal format based on the first image signals.

The normal mode is hereinafter referred to as a first mode, and the infrared projecting mode is referred to as a second mode. The imaging unit 3 causes exposure corresponding to one frame period of the respective second image signals, so as to image an object in the first mode. The imaging unit 3 causes exposure in divided sections of one frame period of the respective second image signals under different imaging conditions, so as to image an object in the second mode.

The image processing unit 5 generates frames of the respective first image signals based on the imaging signals read out in such a manner as to correspond to each exposure corresponding to one frame period in the first mode. The image processing unit 5 generates frames of the respective first image signals based on the imaging signals read out in such a manner as to correspond to each exposure of the divided sections in the second mode.

The image output unit 6 sequentially outputs frames of the second image signals set to a signal format (such as 60i), common to the first mode and the second mode. Accordingly, the images in the first mode and the second mode can be switched therebetween without image distortion. The second signals preferably have horizontal and vertical frequencies common to the first mode and the second mode.

In the second mode of imaging the object by projecting infrared light under the condition that the amount of visible light is small, the imaging unit 3 images the object as described below.

The imaging unit 3 divides one frame period of the respective second image signals into three sections to image the object. The imaging unit 3 images the object in the respective three sections under the different imaging conditions including: a condition that first infrared light is being projected; a condition that second infrared light is being projected; and a condition that third infrared light is being projected. The first infrared light has a first wavelength assigned to red. The second infrared light has a second wavelength assigned to green. The third infrared light has a third wavelength assigned to blue.

In the case where the image output unit 6 outputs the image signals in the interlaced format as the second image signals, each of the imaging unit 3, the image processing unit 5, and the image output unit 6 may operate as described below.

The imaging unit 3 sorts each frame period of the second image signals into two field periods of an odd field period and an even field period, so as to image the object in the first mode. The controller 7 sets the two field periods to have the same maximum exposure time. The image processing unit 5 generates image signals in each of the odd field period and the even field period as the first image signals.

The image output unit 6, in the first mode, generates image signals of an odd field based on the image signals in the odd field period generated by the image processing unit 5, and generates image signals of an even field based on the image signals in the even field period. The image output unit 6, in the second mode, generates image signals in each of the odd field and the even field based on the respective frames of the first image signals generated by the image processing unit 5.

The imaging unit 3 operates as described in detail below, in order that the image output unit 6 sequentially outputs the frames of the second image signals while preventing image distortion.

The first example described with reference to FIG. 30A and FIG. 30B is as follows: In the exposure in the first section, during which the first mode is switched to the second mode, the imaging unit 3 releases the electric charges from the beginning of the maximum exposure time in the field period in the first mode, so that the maximum exposure time results in the same maximum exposure time of each section in the second mode.

In the exposure in the first field period when the second mode is switched to the first mode, the imaging unit 3 sets the maximum exposure time to the same maximum exposure time as in each section in the second mode. The imaging unit 3 reads out, as an imaging signal for one field period, the electric charges stored by exposure in each field period in the first mode.

The second example described with reference to FIG. 31A and FIG. 31B is as follows: In the first mode, the imaging unit 3 sets one field period to the maximum exposure time. Once an exposure with the maximum exposure time ends, the imaging unit 3 reads out the electric charges stored by the exposure as an imaging signal for the period identical to the maximum exposure time of one section in the second mode.

Before reading out the imaging signal, the imaging unit 3 provides a time interval corresponding to a difference between one field period and the maximum exposure time of one section in the second mode.

The third example described with reference to FIG. 32A and FIG. 32B is as follows: The imaging unit 3 causes each exposure in which one field period is set to the maximum exposure time in the first mode.

The imaging unit 3 reads out the electric charges stored by the exposure in the last section in the second mode as an imaging signal in one field period.

The imaging unit 3 reads out the electric charges stored by the exposure in the last field period in the first mode as an imaging signal for the period identical to the maximum exposure time of one section in the second mode.

Method for the Controlling Imaging Device

The controller 7 controls the imaging device as follows:

The controller 7 directs the imaging unit 3 to image an object. The controller 7 directs the image processing unit 5 to generate first image signals based on each imaging signal of the object imaged by the imaging unit 3. The controller 7 directs the image output unit 6 to generate second image signals in a predetermined signal format based on the first image signals.

The controller 7 controls the imaging device, as described below, when the imaging device is set to the first mode. The controller 7 directs the imaging unit 3 to cause each exposure corresponding to one frame period of the respective second image signals, so as to image the object. The controller 7 directs the image processing unit 5 to generate frames of the respective first image signals, based on each imaging signal read out in such a manner as to correspond to each exposure corresponding to one frame period.

The controller 7 controls the imaging device, as described below, when the imaging device is set to the second mode. The controller 7 directs the imaging unit 3 to cause each exposure in divided sections of one frame period of the respective second image signals under different imaging conditions, so as to image the object. The controller 7 directs the image processing unit 5 to generate frames of the respective first image signals, based on each imaging signal read out in such a manner as to correspond to each exposure of the divided sections.

The controller 7 directs the image output unit 6 to sequentially output frames of the second image signals set to a signal format common to the first mode and the second mode. The second signals preferably have horizontal and vertical frequencies common to the first mode and the second mode.

Control Program for Imaging Device

When the mode switching methods described above are controlled and implemented according to a computer program, a control program having the following steps may be executed by a computer installed in the imaging device.

First, the computer is directed to execute the first step of imaging an object by the imaging unit 3. Subsequently, the computer is directed to execute the second step of generating first image signals, based on each imaging signal of the object imaged by the imaging unit 3. Thereafter, the computer is directed to execute the third step of generating second image signals, in a predetermined signal format, based on the first image signals.

When the computer sets the imaging device to the first mode, the first step and the second step are implemented as follows: The first step is a step of directing the imaging unit 3 to cause each exposure corresponding to one frame period of the respective second image signals, so as to image the object. The second step is a step of generating frames of the respective first image signals based on each imaging signal read out in such a manner as to correspond to each exposure corresponding to one frame period.

When the computer sets the imaging device to the second mode, the first step and the second step are implemented as follows: The first step is a step of directing the imaging unit 3 to cause each exposure in divided sections of one frame period of the respective second image signals under different imaging conditions, so as to image the object. The second step is a step of generating frames of the respective first image signals, based on each imaging signal read out in such a manner as to correspond to each exposure of the divided sections.

When the computer switches the imaging device from the first mode to the second mode, or from the second mode to the first mode, the third step is a step of sequentially outputting frames of the second image signals set to a signal format common to the first mode and the second mode. In this step, the second signals preferably have horizontal and vertical frequencies common to the first mode and the second mode.

The control program of the imaging device may be a computer program stored in a computer readable storage medium. The control program may be provided in a state of being stored in the storage medium, or may be provided via a network such as the Internet in a manner such that the control program is downloaded to the computer. The storage medium readable on the computer may be an arbitrary non-transitory storage medium, such as CD-ROM and DVD-ROM.

Applied Example

The operations of the imaging device according to the present embodiment described above may also be applicable to the following case, in addition to the infrared projecting mode of imaging an object while projecting infrared light.

The present embodiment may be applicable to the case of causing each exposure in divided sections of one frame period of the respective second image signals, which is called a multiple exposure, under different imaging conditions (different pressing speeds of a shutter) without projecting infrared light in the state where visible light is present.

The second mode is therefore not limited to the infrared projecting mode, but is applicable to the case of causing each exposure by dividing one frame period of the respective second image signals into, for example, three sections due to a multiple exposure, so as to synthesize imaging signals in the three sections to generate one image signal.

The present invention is not limited to the embodiment described above, and various modifications and improvements can be made without departing from the scope of the present invention. The problems to be solved by the invention, and the object and effects of the invention have been described above in terms of switching between the normal mode and the infrared projecting mode, for reasons of easy understanding of the invention.

As described above, since the operations of the imaging device of the present embodiment are applicable to the case of a multiple exposure, the present invention is not intended to be limited only to the case of switching between the normal mode and the infrared projecting mode, in view of the problems to be solved by the invention, and the object and effects of the invention described above.

The imaging device, the method for controlling the imaging device, and the control program according to the embodiment described above can, without image distortion, switch the images between the first mode of imaging an object without projecting infrared light under the condition that visible light is present, and the second mode of imaging an object while projecting infrared light under the condition that the amount of visible light is small.

What is claimed is:

1. An imaging device comprising:
an imaging unit configured to image an object;
an image processing unit configured to generate first image signals based on imaging signals output from the imaging unit; and
an image output unit configured to generate and output second image signals in a predetermined signal format based on the first image signals, wherein
the imaging unit causes each exposure corresponding to one frame period of the respective second image signals so as to image the object in a first mode, and causes each exposure in divided sections of one frame period of the respective second image signals under different imaging conditions so as to image the object in a second mode,
the image processing unit generates frames of the respective first image signals based on each imaging signal read out in such a manner as to correspond to each exposure corresponding to one frame period in the first mode, and generates frames of the respective first image signals based on each imaging signal read out in such a manner as to correspond to each exposure of the divided sections in the second mode,
the image output unit sequentially outputs frames of the second image signals set to a signal format common to the first mode and the second mode, and
in the second mode, the imaging unit divides one frame period of the respective second image signals into three sections, and images the object in the respective three sections under the different conditions that include a condition that first infrared light having a first wavelength assigned to red is projected, a condition that second infrared light having a second wavelength assigned to green is projected, and a condition that third infrared light having a third wavelength assigned to blue is projected.

2. The imaging device according to claim 1, wherein:
in the first mode, the imaging unit images the object while sorting each frame period of the second image signals into two field periods of an odd field period and an even field period such that the two field periods have an identical maximum exposure time; and
the image processing unit generates an image signal of the odd field period and an image signal of the even field period.

3. The imaging device according to claim 2, wherein:
the image output unit assigns an interlaced format to the signal format;
in the first mode, the image output unit generates an image signal of an odd field based on the image signal of the odd field period generated by the image processing unit and generates an image signal of an even field based on the image signal of the even field period generated by the image processing unit; and
in the second mode, the image output unit generates an image signal of an odd field and an image signal of an even field based on the frames of the respective first image signals generated by the image processing unit.

4. The imaging device according to claim 2, wherein:
in an exposure in a first section during which the first mode is switched to the second mode, the imaging unit releases electric charges from a beginning of the maximum exposure time in the field period in the first mode so that the maximum exposure time results in a maximum exposure time identical to that of each section in the second mode;
in an exposure in a first field period when the second mode is switched to the first mode, the imaging unit sets the maximum exposure time to the maximum exposure time identical to that of each section in the second mode; and
the imaging unit reads out electric charges stored by each exposure in the field periods in the first mode as an imaging signal for one field period.

5. The imaging device according to claim 2, wherein:
the imaging unit sets each field period to the maximum exposure time in the first mode, and once an exposure with the maximum exposure time ends, the imaging unit reads out electric charges stored by the exposure as an imaging signal for a period identical to a maximum exposure time of one section in the second mode; and
before reading out the imaging signal, the imaging unit provides a time interval corresponding to a difference between one field period and the maximum exposure time of one section in the second mode.

6. The imaging device according to claim 2, wherein:
the imaging unit causes each exposure in which each field period is set to the maximum exposure time in the first mode;
the imaging unit reads out electric charges stored by an exposure in last one section in the second mode as an imaging signal for one field period; and
the imaging unit reads out electric charges stored by an exposure in a last field period in the first mode as an imaging signal for a period identical to a maximum exposure time of the one section.

7. A method for controlling an imaging device, comprising:
directing an imaging unit of the imaging device to image an object;
generating first image signals based on each imaging signal of the object imaged by the imaging unit;
generating second image signals in a predetermined signal format based on the first imaging signal;
when setting the imaging device to a first mode,
directing the imaging unit to cause each exposure corresponding to one frame period of the respective second image signals so as to image the object, and
generating frames of the respective first image signals based on each imaging signal read out in such a manner as to correspond to each exposure corresponding to one frame period;
when setting the imaging device to a second mode,
directing the imaging unit to cause each exposure in divided sections of one frame period of the respective second image signals under different imaging conditions so as to image the object, and
generating frames of the respective first image signals based on each imaging signal read out in such a manner as to correspond to each exposure of the divided sections; and
sequentially outputting frames of the second image signals which are set to a signal format and horizontal and vertical frequencies, common to the first mode and the second mode,
wherein, in the second mode, the imaging unit divides one frame period of the respective second image signals into three sections, and images the object in the respective three sections under the different conditions that include a condition that first infrared light having a first wavelength assigned to red is projected, a condition that second infrared light having a second wavelength assigned to green is projected, and a condition that third infrared light having a third wavelength assigned to blue is projected.

8. A control program for an imaging device stored in a non-transitory storage medium and executable by a computer installed in the imaging device to implement steps of the control program, the steps comprising:
a first step of directing an imaging unit of the imaging device to image an object;
a second step of generating first image signals based on each imaging signal of the object imaged by the imaging unit; and
a third step of generating second image signals in a predetermined signal format based on the first imaging signal,
when setting the imaging device to a first mode,
the first step including a step of directing the imaging unit to cause each exposure corresponding to one frame period of the respective second image signals so as to image the object,
the second step including a step of generating frames of the respective first image signals based on each imaging signal read out in such a manner as to correspond to each exposure corresponding to one frame period,
when setting the imaging device to a second mode,
the first step including a step of directing the imaging unit to cause each exposure in divided sections of one frame period of the respective second image signals under different imaging conditions so as to image the object,
the second step including a step of generating frames of the respective first image signals based on each imaging signal read out in such a manner as to correspond to each exposure of the divided sections,
when switching the imaging device from the first mode to the second mode and from the second mode to the first mode, the third step including a step of sequentially outputting frames of the second image signals which are set to a signal format and horizontal and vertical frequencies, common to the first mode and the second mode,
wherein, in the second mode, the imaging unit divides one frame period of the respective second image signals into three sections, and images the object in the respective three sections under the different conditions that include a condition that first infrared light having a first wavelength assigned to red is projected, a condition that second infrared light having a second wavelength assigned to green is projected, and a condition that third infrared light having a third wavelength assigned to blue is projected.

* * * * *